(12) United States Patent
Murayama et al.

(10) Patent No.: US 8,390,565 B2
(45) Date of Patent: Mar. 5, 2013

(54) ELECTROPHORETIC DISPLAY DEVICE AND ELECTRONIC APPARATUS

(75) Inventors: Tetsuro Murayama, Shiojiri (JP); Yasuhiro Shimodaira, Munich (DE); Hiroshi Maeda, Suwa (JP)

(73) Assignee: Seiko Epson Corporation (JP)

( * ) Notice: Subject to any disclaimer, the term of this patent is extended or adjusted under 35 U.S.C. 154(b) by 513 days.

(21) Appl. No.: 12/463,467

(22) Filed: May 11, 2009

(65) Prior Publication Data

US 2010/0001946 A1  Jan. 7, 2010

(30) Foreign Application Priority Data

Jul. 2, 2008 (JP) ................................ 2008-173536

(51) Int. Cl.
*G09G 3/34* (2006.01)
(52) U.S. Cl. .............. 345/107; 345/90; 345/93; 345/98; 359/296
(58) Field of Classification Search ............ 345/87–107; 359/296
See application file for complete search history.

(56) References Cited

U.S. PATENT DOCUMENTS

| | | | |
|---|---|---|---|
| 6,456,267 B1 * | 9/2002 | Sato et al. ........................ | 345/92 |
| 6,552,706 B1 * | 4/2003 | Ikeda et al. ..................... | 345/96 |
| 6,636,194 B2 * | 10/2003 | Ishii ................................ | 345/98 |
| 6,727,883 B2 * | 4/2004 | Uno et al. ...................... | 345/107 |
| 7,019,726 B2 * | 3/2006 | Yokoyama ..................... | 345/98 |
| 7,068,330 B2 * | 6/2006 | Song et al. ..................... | 349/39 |
| 2005/0104823 A1 * | 5/2005 | Giraldo et al. ................. | 345/87 |
| 2006/0103800 A1 * | 5/2006 | Li et al. .......................... | 349/129 |
| 2008/0007816 A1 * | 1/2008 | Maeda ........................... | 359/296 |
| 2008/0238867 A1 | 10/2008 | Maeda et al. | |

FOREIGN PATENT DOCUMENTS

| | | |
|---|---|---|
| JP | 2003-084314 | 3/2003 |
| JP | 2008-033241 | 2/2008 |
| JP | 2008-249792 | 10/2008 |
| JP | 2008-249793 | 10/2008 |

* cited by examiner

*Primary Examiner* — Alexander Eisen
*Assistant Examiner* — Sanjiv D Patel
(74) *Attorney, Agent, or Firm* — Harness, Dickey & Pierce, P.L.C.

(57) ABSTRACT

An electrophoretic display device includes a first substrate and a second substrate that face each other, an electrophoretic element disposed between the first substrate and the second substrate, the electrophoretic element including electrophoretic particles, a display unit that has a plurality of pixels including the electrophoretic element, a common electrode that is formed on an electrophoretic element side of the second substrate, and a first control line and a second control line that are formed in either the first substrate or the second substrate. Each of the plurality of pixels includes a pixel switching element, a memory circuit that is connected to the pixel switching element, a switching circuit that is connected to the memory circuit, and a first pixel electrode and a second pixel electrode that are connected to the switching circuit and are disposed to face the common electrode. The switching circuit includes a first switch that controls a conductive state between the first control line and the first pixel electrode in accordance with an output signal of the memory circuit and a second switch that controls a conductive state between the second control line and the second pixel electrode in accordance with the output signal of the memory circuit.

5 Claims, 16 Drawing Sheets

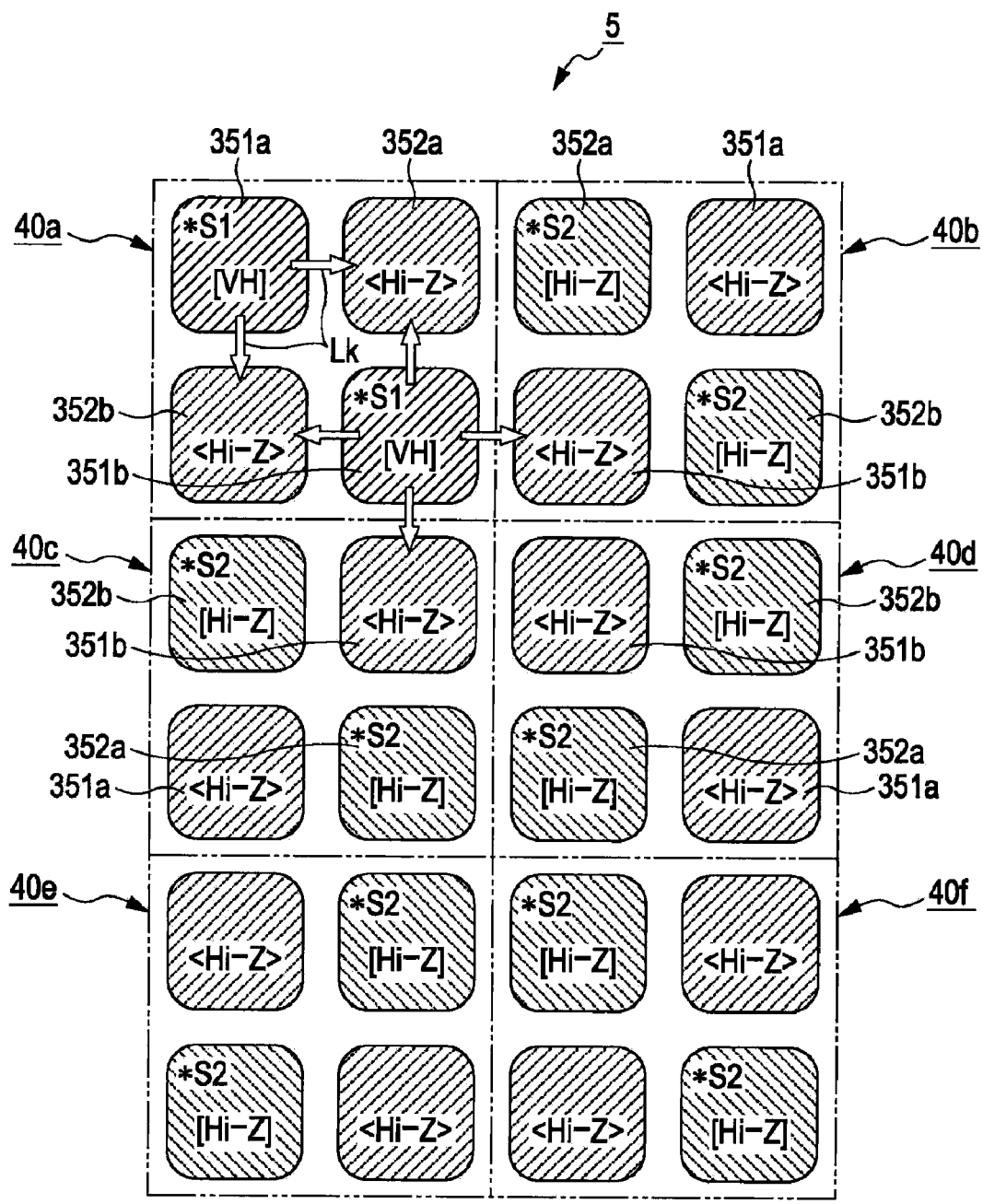

ELECTROPHORETIC DISPLAY DEVICE AND ELECTRONIC APPARATUS

BACKGROUND

1. Technical Field

The present invention relates to an electrophoretic display device and an electronic apparatus.

2. Related Art

As electrophoretic display devices of an active matrix type, devices having a switching transistor and a memory circuit (SRAM: static random access memory) within each pixel have been known (see US 2008/0238867). Furthermore, the applicant of the invention has proposed an electrophoretic display device in which a switching circuit is disposed within a pixel in addition to the memory circuit (see US 2008/0238867).

FIG. 16A is a circuit diagram of a pixel 540 of an electrophoretic display device 500 having the above-described configuration disclosed in US 2008/0238867. FIG. 16B is a schematic cross-section view of a display unit 505 of the electrophoretic display device 500.

As shown in FIG. 16A, the pixel 540 includes a selection transistor 41, a latch circuit 70, a switching circuit 580, a pixel electrode 35, an electrophoretic element 32, and a common electrode 37. In addition, to the pixel 540, a scanning line 66, a data line 68, a high-electric potential power supplying line 50, a low-electric potential power supplying line, a first control line 91, and a second control line 92 are connected.

As shown in FIG. 16B, in the display unit 505 of the electrophoretic display device 500, a plurality of pixel electrodes 35A and 35B are disposed. In addition, between the pixel electrodes 35A and 35B and the common electrode 37 facing both the pixel electrodes 35A and 35B, an electrophoretic element 32 having microcapsules 20 is pinched. The microcapsules 20 and the pixel electrodes 35A and 35B are bonded though an adhesive agent layer 33.

In addition, circuit elements, electrodes, the electrophoretic element, and the like that are shown in FIG. 16 will be described later in detail with reference to FIG. 2 and the like.

The electrophoretic display device 500 disclosed in US 2008/0238867 employs a configuration in which the switching circuits 580 are controlled in accordance with a voltage maintained in the latch circuit 70 and an electric potential (S1 or S2) is input to the pixel electrode 35 by connecting the pixel electrode 35 to any between two control lines 91 and 92 through the switching circuit 580. According to such an electrophoretic display device 500, there are advantages that display of an intermediate gray scale or partial rewriting of the display unit can be performed by controlling the electric potentials of the first and second control lines 91 and 92, and a leakage current between pixels can be decreased.

However, in order to implement new high-level functions and low power consumption of the electrophoretic display device, there are the following problems in the electrophoretic display device disclosed in US 2008/0238867.

In the electrophoretic display device 500, a boundary between a pixel of white display and a pixel of a black display can be displayed clearly. However, when a straight line or a curve that extends in the inclining direction with respect to the arrangement direction of the pixels is represented, there is a problem that jaggies (saw teeth shapes) are recognized visually. For this point, in the electrophoretic display device 500, to be described later in detail, partial rewriting can be performed for the display unit. Accordingly, by disposing a display area of an intermediate gray scale in a boundary portion between white display and black display, an anti-aliasing process can be performed. However, according to the above-described driving method, since image data for displaying the intermediate gray scale needs to be transmitted to the pixel, there are problems that consumption of a current for driving a driver increases, and a time required for completing display is lengthened.

In addition, there is a problem that power consumption increases due to inter-pixel leakage currents in an electrophoretic display device of a microcapsule type, which is not limited to the electrophoretic display device 500. In particular, as shown in FIG. 16B, when a pixel 540A of the black display and the pixel 540B of the white display are located to be adjacent to each other, an electric field E is formed between a pixel electrode 35A having a high-level electric potential VH (for example, 15 V) and a pixel electrode 35B having a low-level electric potential VL (for example, 0 V) in the horizontal direction (substrate surface direction). Thus, inter-pixel leakage currents are generated by the electric field E under the influence of little moisture contained in the adhesive agent layer 33 that bonds the microcapsules and the pixel electrode. In addition, there is a problem that power consumption increases due to the inter-pixel leakage currents.

In addition, generation of the leakage currents due to influence of little moisture and the like represents a possibility that an electrochemical reaction may occur between the pixel electrode 35 and the adhesive agent layer 33. In other words, ionic migration and corrosion that decrease the reliability of the pixel electrodes 35 may occur. When precious metal such as gold or platinum is used as a formation material of the pixel electrode, the reliability is improved. However, by using the precious metal, the cost increases, and the manufacturing process becomes complicated. As a result, it is difficult to suppress the manufacturing cost while improving the reliability.

In the electrophoretic display device 500, when partial rewriting driving is to be performed, the first control line 91 or the second control line 92 that is connected to the pixel electrode 35 of the pixel 540 in which display is not to be changed is in the high impedance state.

FIGS. 17A, 17B, and 18 are explanatory diagrams showing a partial rewriting driving process. FIG. 17A is an explanatory diagram showing a planar structure of the display unit 505 of the electrophoretic display device 500. FIG. 17B is an explanatory diagram showing the cross-section structure of the pixels 540A to 540D shown in FIG. 17A. In addition, FIG. 18 is an explanatory diagram showing the circuit configuration of the pixels 540A, 540E, and 540F shown in FIG. 17A.

In addition, constituent elements shown in FIGS. 17A, 17B, and 18 are described in detail later. The subscripts of "A" to "F" assigned in reference signs are only for identifying a plurality of the pixels 540 and constituent elements thereof.

In the electrophoretic display device 500, when only one pixel 540A is to be rewritten, as shown in FIGS. 17A and 17B, the pixel electrode 35A of the pixel 540A to be rewritten and the first control line 91 are electrically connected through the switching circuit 580A, and the pixel electrodes 35B to 35F of pixels 540B to 540D in which display is maintained and the second control line 92 are electrically connected through switching circuits 580B to 580F. Then, the high-level electric potential VH (for example 15 V) is supplied to the first control line 91, the second control line 92 is set to be in the high impedance state, and the low-level electric potential VL (for example, 0 V) is input to the common electrode 37.

In such a case, in the pixel 540A, the electrophoretic element 32 is driven in accordance with an electric potential difference between the pixel electrode 35A having the high-level electric potential VH and the common electrode 37 having the low-level electric potential VL, and whereby black display is represented. On the other hand, in the other pixels 540B to 540F, the pixel electrodes 35B to 35F are in the high impedance state, and accordingly, there is no electric potential difference between the pixel electrodes 35B to 35F and the common electrode 37, and whereby display is maintained.

In the above-described partial rewriting driving process, display of the pixels 540B to 540F of which pixel electrodes 35B to 35F are in the high impedance state is not changed. However, there is a problem that the contrast actually decreases.

As described above, in the electrophoretic display device of a microcapsule type, inter-pixel leakage is generated though the adhesive agent layer 33. Accordingly, as shown in FIGS. 17A, 17B, and 18, even in the partial rewriting driving process, inter-pixel leakage currents Lk are generated between the pixel electrode 35A of the pixel 540A to be rewritten and the pixel electrodes 35B and 35E that are adjacent to the pixel electrode 35A. Accordingly, an electric potential due to the leakage is input to the pixel electrodes 35B and 35E of the pixels 540B and 540E in which display is maintained.

In such a case, the pixel electrodes 35B to 35F of the pixels 540B to 540E are electrically connected through the second control line 92, and thus, the electric potentials of the pixel electrodes 35B and 35E are supplied to other pixel electrodes 35C and 35F and the like that are adjacent thereto. Then, in the state in which the electric potential is input to the pixel electrodes 35B to 35F as described above, when an image displaying operation is performed by inputting, for example, the low-level electric potential VL to the common electrode 37, display of the pixels 540B to 540F changes, and whereby the whole contrast of the display unit 505 decreases.

SUMMARY

An advantage of some aspects of the invention is that it provides an electrophoretic display device capable of representing a smooth contour in display and suppressing generation of undesirable leakage currents.

According to a first aspect of the invention, there is provided an electrophoretic display device including: a first substrate and a second substrate that face each other so as to pinch an electrophoretic element that includes electrophoretic particles; a display unit that has a plurality of pixels including the electrophoretic element; a common electrode that is formed on an electrophoretic element side of the second substrate; and a first control line and a second control line that are formed in either the first substrate or the second substrate. Each of the plurality of pixels includes: a pixel switching element; a memory circuit that is connected to the pixel switching element; a switching circuit that is connected to the memory circuit; and a first pixel electrode and a second pixel electrode that are connected to the switching circuit and are disposed to face the common electrode. In addition, the switching circuit includes: a first switch that controls a conductive state between the first control line and the first pixel electrode in accordance with an output signal of the memory circuit; and a second switch that controls a conductive state between the second control line and the second pixel electrode in accordance with the output signal of the memory circuit.

According to the above-described electrophoretic display device, in an image displaying operation, at least one between the electric potential of the first pixel electrode connected to the first control line through the first switch and the electric potential of the second pixel electrode connected to the second control line through the second switch can be set to be in a high impedance state in which the pixel electrode is electrically cut off by the first or the second switch.

In an area within a pixel of which the pixel electrode is in the high impedance state, the electrophoretic element is not driven in principle. However, inter-pixel leakage occurs actually, and accordingly, electric charges move between the above-described pixel electrode and a pixel electrode to which an electric potential is input. In such a case, the electric potential of the first or second pixel electrode that is in the high impedance state is in correspondence with the electric potential of the first or second pixel electrode, to which the electric potential is input, that exists in the vicinity thereof.

For example, when many pixel electrodes having the high-level electric potential are disposed near the pixel electrode that is in the high impedance state, the electric potential of the pixel electrode that is in the high impedance state becomes a middle electric potential (50% to 100% of the high-level electric potential) that is close to the high-level electric potential. On the other hand, when many pixel electrodes having the low-level electric potential are disposed near the pixel electrode, the electric potential of the pixel electrode that is in the high impedance state becomes a middle electric potential (0% to 50% of the high-level electric potential) that is close to the low-level electric potential.

As described above, the pixel electrode that is in the high impedance state has the middle electric potential between the high-level electric potential and the low-level electric potential, and accordingly, the electrophoretic element located on the pixel electrode represents a middle gray scale corresponding to the electric potential of the pixel electrode. For example, when the electric potential of the pixel electrode is about 80% of the high-level electric potential, an area located on the pixel electrode is represented by a half-tone display of a dark gray color. On the other hand, when the electric potential of the pixel electrode is about 20% of the high-level electric potential, an area located on the pixel electrode is represented by a half-tone display of a light gray color.

Thus, in the above-described electrophoretic display device, since an area of the half-tone display is formed in a boundary of areas that are formed of pixels having different gray scales, an image for which a naturalization process and an antialiasing process are performed is displayed. As a result, according to the above-described electrophoretic display device, display in which a contour is represented smoothly can be acquired.

In the above-described electrophoretic display device, it is preferable that a plurality of the first pixel electrodes and a plurality of the second pixel electrodes are disposed in each of the plurality of pixels.

In such a case, the pixel is divided into more sub pixels, and accordingly, the resolution in the contour of the image is substantially improved. Therefore, high-quality display can be acquired. In addition, by increasing the number of divisions, a boundary length between the first pixel electrode and the second pixel electrode is shortened. In addition, a distance between pixel electrodes having different electric potentials is lengthened, and thereby the leakage current can be reduced.

In the above-described electrophoretic display device, it is preferable that a plurality of the first pixel electrodes and a plurality of the second pixel electrodes, which correspond to a same number, are disposed in each of the plurality of pixels.

In such a case, a total area of the first pixel electrodes and a total area of the second pixel electrodes can be set to be the same in an easy manner. Accordingly, variances of the reflectivity of each pixel due to a difference of both the areas can be prevented.

In the above-described electrophoretic display device, it is preferable that, in a boundary portion of two adjacent pixels among the plurality of pixels, one of the first pixel electrodes of one pixel between the two adjacent pixels and one of the second pixel electrodes of the other pixel between the two adjacent pixels are disposed to be adjacent to each other.

In such a case, in a boundary of pixels having different gray scales, the first pixel electrode and the second pixel electrode having different electric potentials are disposed to be adjacent. Accordingly, blurring of the contour in a portion in which the contour of the image is a straight line can be prevented.

In the above-described electrophoretic display device, it is preferable that, in a boundary portion of two adjacent pixels among the plurality of pixels, one of the first pixel electrodes of one pixel between the two adjacent pixels and one of the first pixel electrodes of the other pixel between the two adjacent pixels are disposed to be adjacent to each other.

In such a case, the contour of the image can be represented more smoothly. In addition, an electrophoretic display device in which a decrease in the contrast does not occur in a partial rewriting driving process can be implemented.

In the above-described electrophoretic display device, it is preferable that two of the first pixel electrodes and two of the second pixel electrodes are disposed in each of the plurality of pixels, and the first pixel electrodes and the second pixels are disposed so as to be alternated two-dimensionally within each of the plurality of pixels.

In such a case, deviation of display in each pixel can be prevented. In addition, the flow of electric charges in the pixel electrodes that are in the high impedance state can be uniform.

In the above-described electrophoretic display device, it is preferable that at least one electrode between the first electrode and the second electrode that configure each of the plurality of pixels is in a high impedance state at the time of performing an image displaying operation. In such a case, the electrophoretic display device can be determined.

According to a second aspect of the invention, there is provided an electronic apparatus including the above-described electrophoretic display device.

According to the above-described electronic apparatus, an electronic apparatus having a display unit capable of performing high-quality display having a smooth contour can be provided.

BRIEF DESCRIPTION OF THE DRAWINGS

The invention will be described with reference to the accompanying drawings, wherein like numbers reference like elements.

FIG. 11 is an explanatory diagram showing the electric potential state of a display unit in a driving process for partial rewriting according to an embodiment of the invention.

DESCRIPTION OF EXEMPLARY EMBODIMENTS

Figure 1:
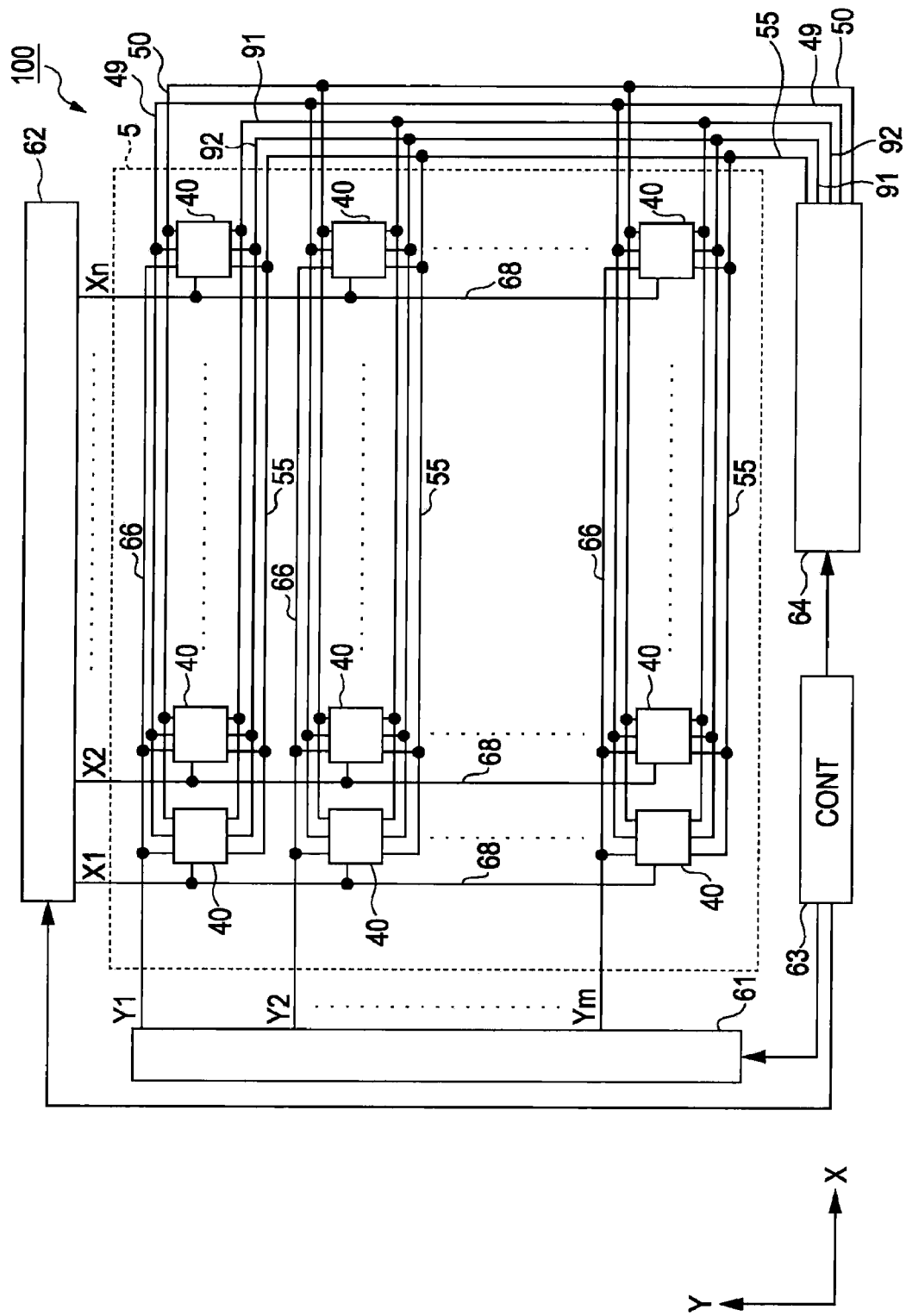
FIG. 1 is a schematic diagram showing the configuration of an electrophoretic display device according to an embodiment of the invention.

Hereinafter, an electrophoretic display device of an active matrix type according to an embodiment of the invention will be described with reference to the accompanying drawings.

This embodiment represents one form of the invention and does not limit the scope of the invention. Thus, the embodiment can be arbitrarily changed within the scope of the technical idea of the invention. In addition, in the drawings below, for easy understanding of each configuration, the scales, the numbers, and the like may be represented to be different from those of the actual structure.

FIG. 1 is a schematic diagram showing the configuration of an electrophoretic display device 100 according to an embodiment of the invention.

The electrophoretic display device 100 includes a display unit 5 in which a plurality of pixels 40 is arranged. In the periphery of the display unit 5, a scanning line driving circuit 61, a data line driving circuit 62, a controller (control unit) 63, and a common power source modulating circuit 64 are disposed. The scanning line driving circuit 61, the data line driving circuit 62, and the common power source modulating circuit 64 are connected to the controller 63. The controller 63 comprehensively controls the above-described circuits based on image data and a synchronization signal that are supplied from an upper-level apparatus.

In the display unit 5, a plurality of scanning lines 66 that extends from the scanning line driving circuit 61 and a plurality of data lines 68 that extends from the data line driving circuit 62 are formed. In addition, pixels 40 are disposed in correspondence with intersections of the plurality of scanning lines 66 and the plurality of data lines 68.

The scanning line driving circuit 61 is connected to the pixels 40 through m scanning lines 66 (Y1, Y2, ..., Ym). The scanning line driving circuit 61 sequentially selects the scanning lines 66 of the 1st row to the m-th row under control of the controller 63. In addition, the scanning line driving circuit 61 supplies a selection signal that defines an ON timing to a selection transistor 41 (see FIG. 2) disposed in each pixel 40 through the selected scanning line 66.

The data line driving circuit 62 is connected to the pixels 40 through n data lines 68 (X1, X2, ..., Xn) and supplies an image signal, which defines one bit pixel data corresponding to each pixel 40, to the pixel 40 under control of the controller 63.

In addition, in this embodiment, it is assumed that a low-level (L) image signal is supplied to the pixel 40 for defining the pixel data of "0", and a high-level (H) image signal is supplied to the pixel 40 for defining the pixel data of "1".

In the display unit 5, five global wirings (a low-electric potential power supplying line 49, a high-electric potential power supplying line 50, a common electrode wiring 55, a first control line 91, and a second control line 92) that extend from the common power source modulating circuit 64 are disposed, and each wiring is connected to the pixels 40. The common power source modulating circuit 64 generates various signals to be supplied to the above-described wirings and electrically connects or disconnects (high impedance state) the wirings, under control of the controller 63.

Figure 2:
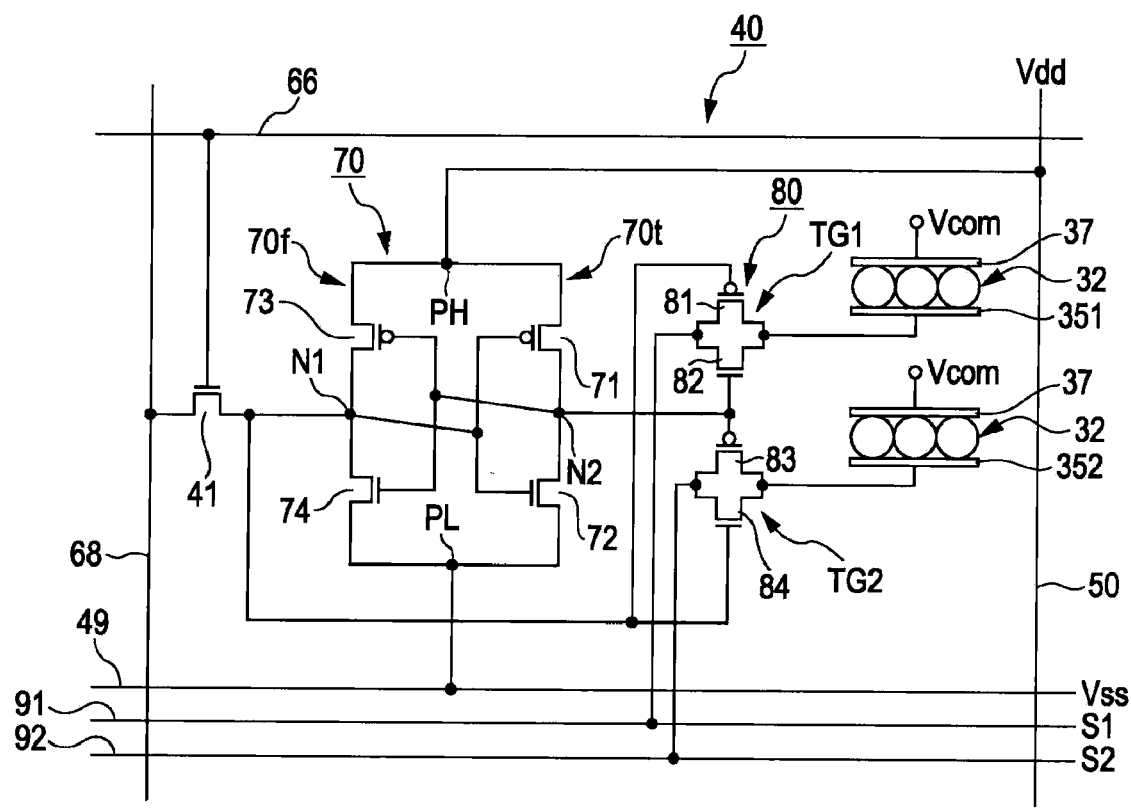
FIG. 2 is a circuit diagram of a pixel according to an embodiment of the invention.

FIG. 2 is a circuit diagram of the pixel 40.

In the pixel 40, a selection transistor 41 (pixel switching element), a latch circuit (memory circuit) 70, a switching circuit 80, an electrophoretic element 32, a first pixel electrode 351, a second pixel electrode 352, and a common electrode 37 as an opposing electrode are disposed. The scanning line 66, the data line 68, the low-electric potential power supplying line 49, the high-electric potential power supplying line 50, the first control line 91, and the second control line 92 are disposed so as to surround the above-described elements. The configuration of the pixel 40 is an SRAM (static random access memory) type in which an image signal is maintained as an electric potential by the latch circuit 70.

Among the above-described elements, a part constituted by the selection transistor 41, the latch circuit 70, the switching circuit 80, and the first and second pixel electrodes 351 and 352 is referred to also as a pixel circuit. The global wirings that include the pixel circuit, the common electrode 37, the first control line 91, and the second control line 92 are driven by the scanning line driving circuit 61, the data line driving circuit 62, and the common power source modulating circuit 64.

The selection transistor 41 is a pixel switching element formed of an N-MOS (negative metal oxide semiconductor) transistor. The gate terminal of the selection transistor 41 is connected to the scanning line 66, the source terminal of the selection transistor 41 is connected to the data line 68, and the drain terminal of the selection transistor 41 is connected to a data input terminal N1 of the latch circuit 70.

The latch circuit 70 includes a transfer inverter 70t and a feedback inverter 70f. Both the transfer inverter 70t and the feedback inverter 70f are C-MOS inverters. The transfer inverter 70t and the feedback inverter 70f form a loop structure in which, to each input terminal of one between the transfer inverter and the feedback inverter, an output terminal of the other is connected. In addition, to each inverter, a power source voltage of a high electric potential is supplied from the high-electric potential power supplying line 50 that is connected through a high-electric potential power supplying terminal PH. In addition, to each inverter, a power source voltage of a low electric potential is supplied from the low-electric potential power supplying line 49 that is connected through a low-electric potential power supplying terminal PL.

The transfer inverter 70t includes a P-MOS (positive metal oxide semiconductor) transistor 71 and an N-MOS transistor 72 having drain terminals connected to the data output terminal N2. The source terminal of the P-MOS transistor 71 is connected to the high-electric potential power supplying terminal PH, and the source terminal of the N-MOS transistor 72 is connected to the low-electric potential power supplying terminal PL. The gate terminals (the input terminal of the transfer inverter 70t) of the P-MOS transistor 71 and the N-MOS transistor 72 are connected to the data input terminal N1 (the output terminal of the feedback inverter 70f).

The feedback inverter 70f includes a P-MOS transistor 73 and an N-MOS transistor 74 of which drain terminals are connected to the data input terminal N1. The gate terminals (the input terminal of the feedback inverter 70f) of the P-MOS transistor 73 and the N-MOS transistor 74 are connected to the data output terminal N2 (the output terminal of the transfer inverter 70t).

When an image signal (pixel data of "1") of a high level (H) is stored in the latch circuit 70 having the above-described configuration, a low-level (L) signal is output from the data output terminal N2 of the latch circuit 70. On the other hand, when an image signal (pixel data of "0") of a low level (L) is stored in the latch circuit 70, a high-level (H) signal is output from the data output terminal N2.

The data input terminal N1 and the data output terminal N2 of the latch circuit 70 is connected to the switching circuit 80. In addition, the switching circuit 80 is connected to the first and second pixel electrodes 351 and 352 and the first and second control lines 91 and 92. The switching circuit 80 is configured to include a first transmission gate TG1 (a first switch) and a second transmission gate TG2 (a second switch).

The first transmission gate TG1 is formed of a P-MOS transistor 81 and an N-MOS transistor 82. The source terminals of the P-MOS transistor 81 and the N-MOS transistor 82 are connected to the first control line 91, and the drain terminals of the P-MOS transistor 81 and the N-MOS transistor 82 are connected to the pixel electrode 351. In addition, the gate terminal of the P-MOS transistor 81 is connected to the data input terminal N1 of the latch circuit 70, and the gate terminal of the N-MOS transistor 82 is connected to the data output terminal N2 of the latch circuit 70.

The second transmission gate TG2 is formed of a P-MOS transistor 83 and an N-MOS transistor 84. The source terminals of the P-MOS transistor 83 and the N-MOS transistor 84 are connected to the second control line 92, and the drain terminals of the P-MOS transistor 83 and the N-MOS transistor 84 are connected to the second pixel electrode 352. In addition, the gate terminal of the P-MOS transistor 83 is connected to the data output terminal N2 of the latch circuit 70, and the gate terminal of the N-MOS transistor 84 is connected to the data input terminal N1 of the latch circuit 70.

Here, when an image signal of the low level (L) (pixel data of "0") is stored in the latch circuit 70 and thus, a high-level (H) signal is output from the data output terminal N2, the first transmission gate TG1 is in the ON-state. Accordingly, the first control line 91 and the first pixel electrode 351 are electrically connected, and whereby the electric potential S1 of the first control line 91 is input to the first pixel electrode 351. At this moment, the second transmission gate TG2 is in the OFF state in accordance with the output signal of the latch circuit 70, and accordingly, the second pixel electrode 352 is in the high impedance state.

On the other hand, when an image signal of the high level (H) (pixel data of "1") is stored in the latch circuit 70 and thus, a low-level (L) signal is output from the data output terminal N2, the second transmission gate TG2 is in the ON-state. Accordingly, the electric potential S2 of the second control line 92 is input to the second pixel electrode 352. At this moment, the first transmission gate TG1 is in the OFF state, and accordingly, the first pixel electrode 351 is in the high impedance state.

As described above, in the pixel 40, the first transmission gate TG1 or the second transmission gate TG2 exclusively operates based on an image signal that is stored in the latch circuit 70. Accordingly, only one pixel electrode between the first pixel electrode 351 and the second pixel electrode 352 is connected to a corresponding control line, and the other pixel electrode is in the high-impedance state.

Figure 3:
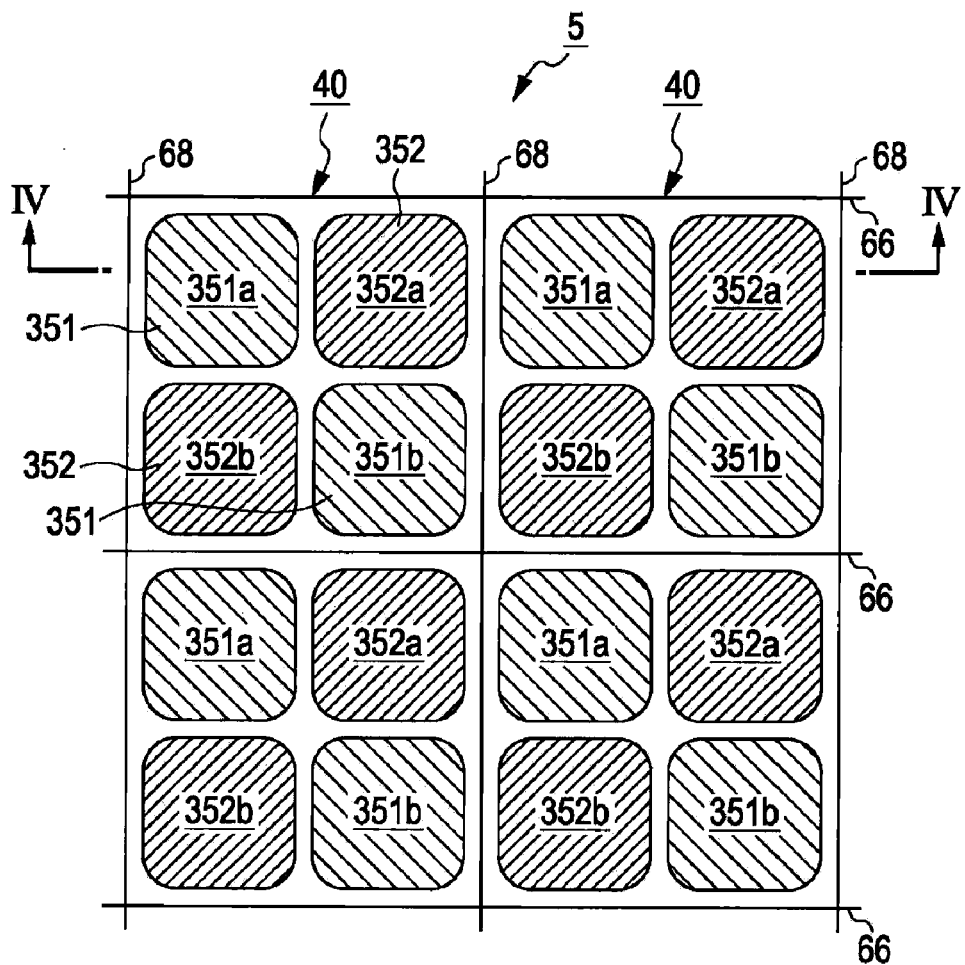
FIG. 3 is an explanatory diagram showing two-dimensional disposition of pixel electrodes and the like (first pixel arrangement) according to an embodiment of the invention.
Figure 4:
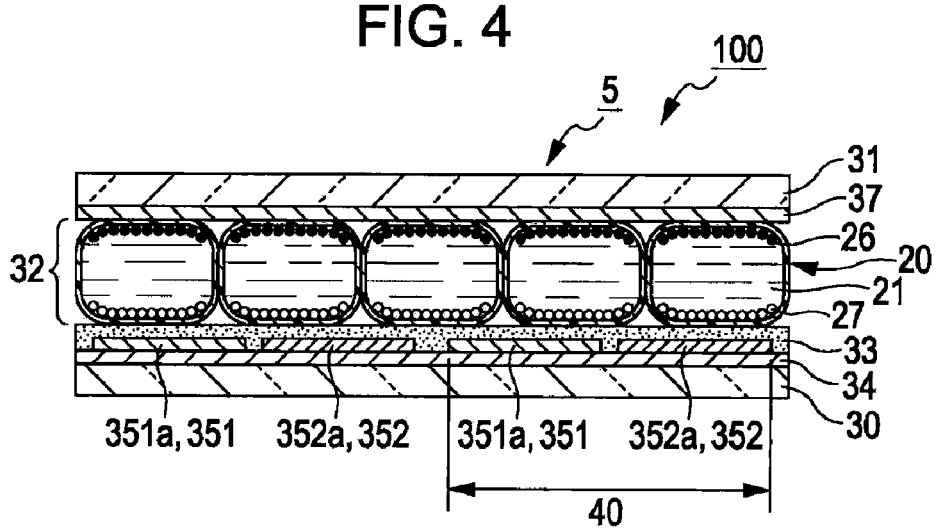
FIG. 4 is a partial cross-section view taken along line IV-IV shown in FIG. 3.

FIG. 3 is a diagram showing two-dimensional disposition of the first and second electrodes 351 and 352, the scanning lines 66, and the data lines 68 in the display unit 5. FIG. 4 is a partial cross-section view of the electrophoretic display device 100 taken along line IV-IV shown in FIG. 3.

As shown in FIG. 3, in the display unit 5, a plurality of the pixels 40 is arranged in a matrix shape. In addition, the scanning lines 66 and the data lines 68 extend in boundary areas of adjacent pixels 40. In each pixel 40, two first pixel electrodes 351 (351a and 351b) and two second pixel electrodes 352 (352a and 352b) are disposed so as to be alternated in a square. In other words, in a planar area of the pixels 40 having an approximate square shape, the first pixel electrodes 351a and 351b having an approximate square shape are disposed in one diagonal position, and the second pixel electrodes 352a and 352b are disposed in the other diagonal position. According to this embodiment, in the display unit 5, adjacent pixels 40 are regularly arranged such that pixel electrodes of a same type (the first pixel electrodes 351 or the second pixel electrodes 352) are not located to be adjacent to each other.

Both the first pixel electrodes 351a and 351b disposed within the pixel 40 are connected to the first transmission gate TG1 shown in FIG. 2. In addition, both the second pixel electrodes 352a and 352b are connected to the second transmission gate TG2.

In other words, each pixel 40 has two first sub pixels corresponding to two first pixel electrodes 351a and 351b that are disposed in one diagonal direction and two second sub pixels corresponding to two second pixel electrodes 352a and 352b that are disposed in the other diagonal direction.

As shown in FIG. 4, the electrophoretic display device 100 has a configuration in which the electrophoretic element 32 formed by arranging a plurality of microcapsules 20 is pinched between a component substrate 30 (first substrate) and an opposing substrate 31 (second substrate). In the display unit 5, on the electrophoretic element 32 side of the component substrate 30, the first pixel electrodes 351a (351) and the second pixel electrodes 352a (352) are arranged alternately, and the electrophoretic element 32 is bonded to the first pixel electrode 351 and the second pixel electrode 352 through an adhesive agent layer 33.

The component substrate 30 is a substrate that is formed of glass, plastic, or the like. Since the component substrate 30 is disposed on a side opposite to an image display surface, the component substrate 30 may not be configured to be transparent. On the component substrate 30, a circuit layer 34 that includes the scanning lines 66, the data lines 68, the selection transistors 41, the latch circuits 70, the switching circuits 80, and the like that are shown in FIGS. 1 and 2 is formed. On the circuit layer 34, the first and second pixel electrodes 351 and 352 are formed. The first and second pixel electrodes 351 and 352 are formed by laminating a nickel coating and a gold coating on a Cu thin film, Al, ITO (indium tin oxide), or the like in the described order.

On the other hand, the opposing substrate 31 is a substrate that is formed of glass or plastic. Since the opposing substrate 31 is disposed on the image display side, the opposing substrate 31 is formed of a transparent substrate. On the electrophoretic element 32 side of the opposing substrate 31, a common electrode (opposing electrode) 37 of a planar shape that faces the plurality of pixel electrodes 351 and 352 is formed, and the electrophoretic element 32 is formed on the common electrode 37. The common electrode 37 is a transparent electrode that is formed of MgAg, ITO, IZO (indium zinc oxide), or the like.

In addition, generally, the electrophoretic element 32 is formed on the opposing substrate side 31 in advance and is handled as an electrophoretic sheet that includes up to the adhesive agent layer 33. In the manufacturing process, the electrophoretic sheet is handled in a state in which a protection thin sheet is attached to the surface of the adhesive agent layer 33. Then, the display unit 5 is formed by attaching the electrophoretic sheet, from which the thin sheet is detached, to the component substrate 30 (the first and second pixel electrodes 351 and 352, various circuits, and the like are formed therein) that is manufactured separately. Accordingly, the adhesive agent layer 33 exists only on the first and second pixel electrode 351 and 352 side.

The microcapsule 20, for example, has a particle diameter of about 50 μm and is a sphere-shaped body in which a dispersion medium 21, a plurality of white particles (electrophoretic particles) 27, and a plurality of black particles (electrophoretic particles) 26 are enclosed. The microcapsule 20, as shown in FIG. 4, is pinched by the common electrode 37 and the first and second pixel electrodes 351 and 352. One or a plurality of the microcapsules 20 may be included in one pixel 40, and a plurality of the pixels 40 may be included in a planar area of one microcapsule 20.

The outer shell part (wall film) of the microcapsule 20 is formed of a transparent high molecular resin such as acryl resin including polymethylmethacrylate, polyethylmethacrylate, or the like, urea resin, gum Arabic, or the like.

The dispersion medium 21 is a liquid that disperses the white particles 27 and the black particles 26 into the microcapsule 20. As the dispersion medium 21, water, an alcohol-based solvent (methanol, ethanol, isopropanol, butanol, octanol, or methyl cellosolve or the like), esters (acetic ethyl or, acetic butyl, or the like), ketones (acetone, methylethylketone, methylisobutylketone, or the like), aliphatic hydrocarbon (pentane, hexane, octane, or the like), cycloaliphatic hydrocarbon (cyclohexane, methylcyclohexane, or the like), aromatic hydrocarbon (benzene, toluene, benzenes having a long-chain alkyl group (xylene, hexylbenzene, hebuthylbenzene, octylbenzene, nonylbenzene, decylbenzene, undecylbenzenesulfonate, dodecylbenzene, tridecylebenzene, tetradecylbenzene, or the like)), halogenated hydrocarbon (methylene chloride, chloroform, carbon tetrachloride, 1,2-dichloroethane, or the like), carboxylate, or other kinds of oils can be used. The above-described materials may be used in the form of a single material or a mixture. Further, surfactant or the like may be added to the above-described material.

The white particles 27 are particles (polymer particles or colloids) made of white pigment such as titanium dioxide, zinc oxide, or antimony trioxide and, for example, are used in a negatively charged state. The black particles 26, for example, are particles (polymer particles or colloids) made of black pigment such as aniline black or carbon black and, for example, are used in a positively charged state.

In addition, a charge control agent containing particles of an electrolyte, a surfactant, metal soap, a resin, rubber, oil, varnish, compound, or the like; a dispersant such as a titanium-coupling agent, an aluminum-coupling agent, and a silane-coupling agent; a lubricant; a stabilizing agent; or the like may be added to the above-described pigment, as is needed.

Instead of the black particles 26 and the white particles 27, for example, pigment of a red color, a green color, a blue color, or the like may be used. Under such a configuration, the red color, the green color, the blue color, or the like may be displayed in the display unit 5.

Figure 5A:
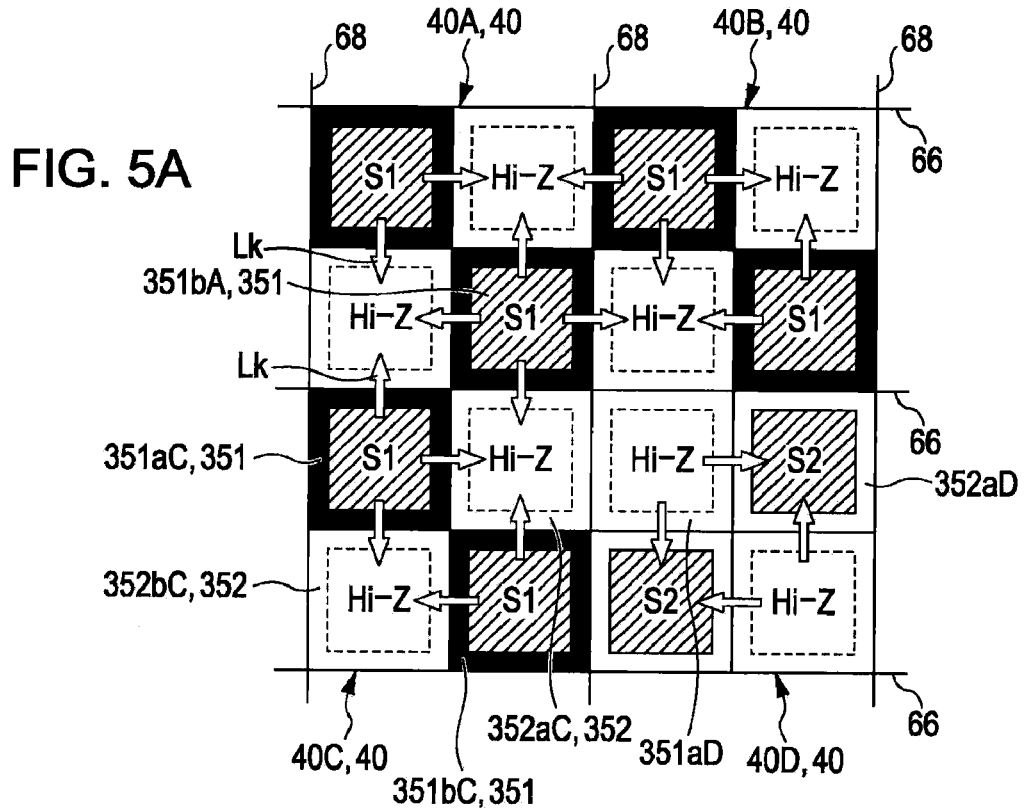
FIGS. 5A and 5B are explanatory reaction diagrams showing a planar structure of a display unit according to an embodiment of the invention.
Figure 5B:
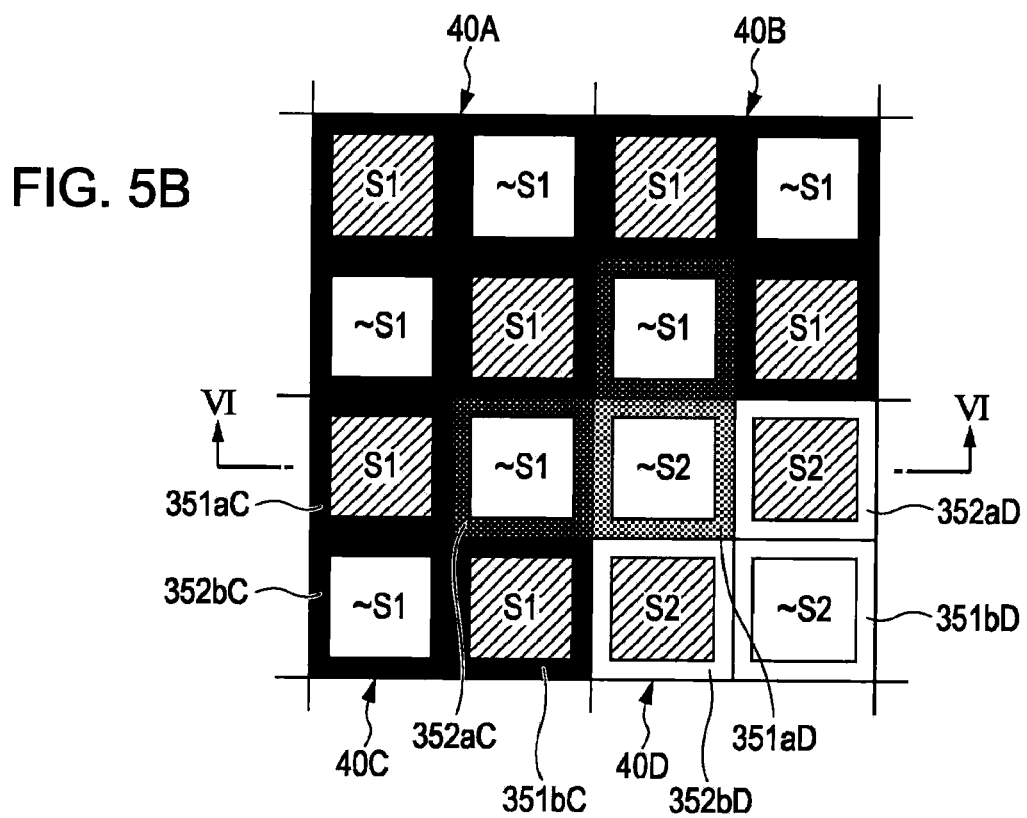
Figure 6:
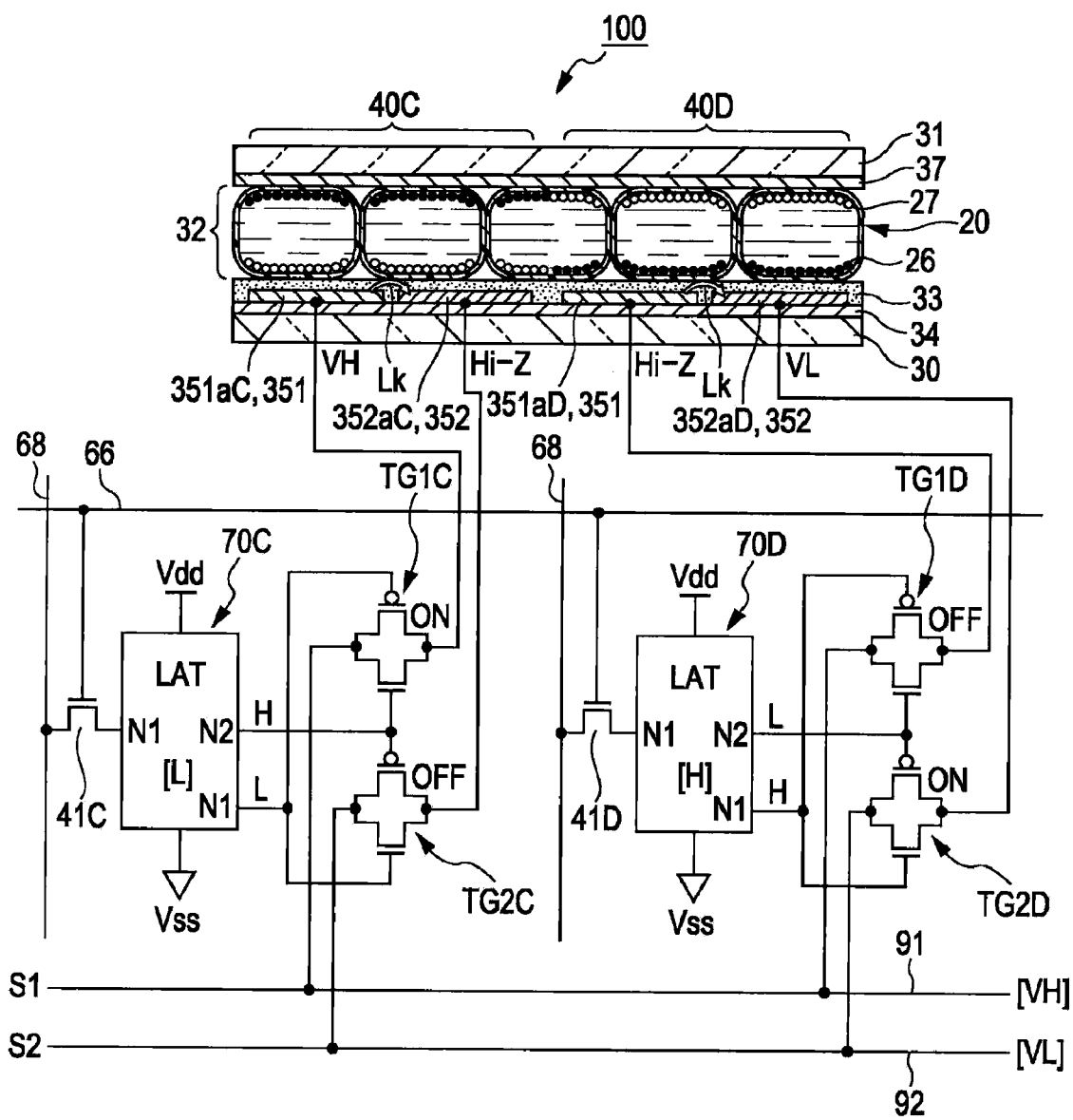
FIG. 6 is an explanatory diagram showing a cross-section structure taken along line VI-VI shown in FIG. 5B together with a pixel circuit.

Next, FIGS. 5A and 5B are explanatory reaction diagrams showing a planar structure of the display unit 5. FIG. 6 is an explanatory diagram showing a cross-section structure taken along line VI-VI shown in FIG. 5B together with a pixel circuit.

In addition, subscripts of "A", "B", "C", and "D" of portions that are shown in FIGS. 5A, 5B, and 6 are assigned so as to clearly identify to which pixel among the pixels 40A to 40D the constituent elements belong.

In FIGS. 5A and 5B, among the pixels 40 arranged in the display unit 5, four pixels 40A to 40D that are disposed in two rows and two columns are shown. Among the pixels 40A to 40D, three pixels 40A to 40C display a black color, and the pixel 40D displays a white color.

Here, an image displaying operation in the pixels 40 will be described with reference to FIG. 6.

In order to acquire the display state shown in FIGS. 5A and 5B, first, an image signal (image data) is stored in the latch circuits 70 of the pixels 40 (an image signal inputting step). For the pixels 40C and 40D shown in FIG. 6, a low-level (L) image signal is input from the data line 68 to the latch circuit 70C of the pixel 40C through the selection transistor 41C and is stored as an electric potential, and a high-level (H) image signal is input to the latch circuit 70D of the pixel 40D and is stored as an electric potential.

In addition, in the image signal inputting step, it is preferable that the pixel circuit is operated by using a voltage for which image signals can be written and maintained in the latch circuits 70C and 70D. Accordingly, in the image signal inputting step, for example, the high-level electric potential of the image signal is set to 2 to 5 V, the low-level electric potential is set to 0 V, the electric potential Vdd of the high-electric potential power supplying line 50 is set to 2 to 5 V, and the electric potential Vss of the low electric potential power supplying line 49 is set to 0 V.

When image signals are written into the latch circuits 70C and 70D, an operation for displaying an image by driving the electrophoretic element 32 is performed (image displaying step).

In such a step, to the first and second control lines 91 and 92 and the common electrode 37, electric potentials for image display are supplied. In particular, the electric potential S1 of the first control line 91 becomes the high-level electric potential VH (for example, 10 to 15 V), and the electric potential S2 of the second control line 92 becomes the low-level electric potential VL (for example, 0 V). To the common electrode 37, a rectangular-shaped pulse in which the high-level electric potential VH and the low-level electric potential VL are repeated for a predetermined period is input.

In addition, in order to supply the electric potentials VH and VL for image display to the first and second pixel electrodes 351 and 352, the power source voltages of the latch circuits 70C and 70D rise. In other words, the electric potential Vdd of the high-electric potential power supplying line 50 rises to the high-level electric potential VH, and the electric potential Vss of the low-electric potential power supplying line 49 becomes the low-level electric potential VL.

From the data output terminal N2 of the latch circuit 70C in which the low-level (L) image signal is maintained, the high-level (H) electric potential (Vdd) is output. In addition, from the data input terminal N1 thereof, the low-level (L) electric potential (Vss) is output. Accordingly, in the pixel 40C, the first transmission gate TG1C is in the ON state, and the electric potential S1 (high-level electric potential VH) of the first control line 91 is input to the first pixel electrode 351aC (and 351bC). In addition, the second transmission gate TG2C is in the OFF state, and accordingly, the second pixel electrode 352aC (and 352bC) is in the high impedance state.

Accordingly, electric fields are formed between the first pixel electrodes 351aC and 351bC and the common electrode 37 during a period in which the electric potential Vcom of the common electrode 37 is the low-level electric potential VL. Therefore, the electrophoretic element 32 is driven in accordance with the applied electric fields. Accordingly, as shown in FIG. 5A, the first sub pixel corresponding to the first pixel electrodes 351aC and 351bC displays a black color. In addition, also in the pixels 40A and 40B, by the above-described operation, the first sub pixel corresponding to the first pixel electrode 351 displays the black color.

On the other hand, in the pixel 40D, from the data output terminal N2 of the latch circuit 70D in which the high-level (H) image signal is maintained, the low-level (L) electric potential (Vss) is output. In addition, from the data input terminal N1 thereof, the high-level (H) electric potential (Vdd) is output. Accordingly, the second transmission gate TG2D is in the ON state, and the electric potential S2 (low-level electric potential VL) of the second control line 92 is input to the second pixel electrode 352aD (and 352bD). In addition, the first transmission gate TG1D is in the OFF state, and accordingly, the first pixel electrode 351aD (and 351bD) is in the high impedance state.

Accordingly, electric fields are formed between the second pixel electrodes 352aD and 352bD and the common electrode 37 during a period in which the electric potential Vcom of the common electrode 37 is the high-level electric potential VH. Therefore, the electrophoretic element 32 is driven in accordance with the applied electric fields. Accordingly, as shown in FIG. 5A, the second sub pixel corresponding to the second pixel electrodes 352aD and 352bD displays the white color.

By performing the above-described operations, as shown in FIG. 5A, a part of the sub pixels of the pixels 40A to 40D can display the black color or the white color.

Here, in each pixel 40A to 40D, there are the first pixel electrode 351 or the second pixel electrode 352 to which the electric potential is input and the first pixel electrode 351 or the second pixel electrode 352 that is in the high impedance state. In the adhesive agent layer 33 that bonds the microcapsule 20 and the first and second pixel electrodes 351 and 352, an adhesive agent that does not have high resistance is used for decreasing loss of the voltage applied to the microcapsule 20. Accordingly, as shown in FIG. 5A, between the first pixel electrode 351 or the second pixel electrode 352 to which the electric potential is input and the first pixel electrode 351 or the second pixel electrode 352 that is in the high impedance state, an inter-pixel leakage current Lk is generated.

In particular, the second pixel electrode 352aC of the pixel 40C has three sides surrounded by the first pixel electrodes 351 (351bA, 351aC, and 351bC) to which the electric potential S1 (high-level electric potential VH) is input, and accordingly, electric charges flow therein from the first pixel electrodes 351. Thus, the second pixel electrode 352aC that is in the high impedance state also has a high electric potential close to the high-level electric potential VH. In addition, the second pixel electrode 352bC, similarly, also has a high electric potential that is close to the high-level electric potential VH due to leakage between pixels. Accordingly, also in the second sub pixels corresponding to the second pixel electrodes 352aC and 352bC, the electrophoretic elements 32 are driven. Therefore, as shown in FIG. 5B, the second sub pixels display the black color, same as the first sub pixels corresponding to the first pixel electrodes 351aC and 351bC. As a result, all the first and second sub pixels that configure the pixel 40C display the black color.

On the other hand, in the pixel 40D, both the second pixels 352aD and 352bD have the low-level electric potential VL, leakage currents flow from the first pixel electrodes 351aD and 351bD that are in the high impedance state toward adjacent second pixel electrodes 352aD and 352bD. Accordingly, the first pixel electrodes 351aD and 351bD have a low electric potential that is close to the low-level electric potential VL. Therefore, also in the first sub pixels corresponding to the first pixel electrodes 351aD and 351bD, the electrophoretic elements 32 are driven. Accordingly, as shown in FIG. 5B, the first sub pixels display the white color, same as the second sub pixels corresponding to the second pixel electrodes 352aD and 352bD. As a result, all the first sub pixels and the second sub pixels that configure the pixel 40D display the white color.

In addition, the electric potentials of the first and second pixel electrodes 351 and 352 that are in the high impedance state are changed in accordance with the electric potentials of the first and second pixel electrodes 351 and 352 that are located adjacent thereto. For example, in the pixel 40C, the second pixel electrode 352bC that is surrounded only by the first pixel electrodes 351aC and 351bC that have the high-level electric potential VH has an electric potential that is almost the same as the high-level electric potential VH. In addition, in the pixel 40D, the electric potential of the first pixel electrode 351bD that is located adjacent only to the second pixel electrodes 352aD and 352bD having the low-level electric potential VL becomes an electric potential that is almost the same as the low-level electric potential VL.

Accordingly, in an area in which pixels 40 of black display are continuously disposed, the first sub pixel and the second sub pixel display the black color having an approximately same reflectivity. In addition, in an area in which pixels 40 of white display are continuously disposed, the first sub pixel and the second sub pixel display the white color having an approximately same reflectivity.

On the other hand, in a row (a third row from the upper side) to which the first pixel electrode 351aC and the second pixel electrode 352aC of the pixel 40C and the first pixel electrode 351aD and the second pixel electrode 352aD of the pixel 40D, the second pixel electrode 352aC and the first pixel electrode 351aD that are in the high impedance state are disposed between the first pixel electrode 351aC of the high-level electric potential VH and the second pixel electrode 352aD of the low-level electric potential VL. In such a case, the electric potentials of the second pixel electrode 352aC and the first pixel electrode 351aD have electric potentials between the high-level electric potential VH and the low-level electric potential VL.

In particular, the second pixel electrode 352aC that is adjacent to the first pixel electrode 351aC of the high-level electric potential VH has a middle electric potential that is relatively high. In addition, the first pixel electrode 351aD that is adjacent to the second pixel electrode 352aD of the low-level electric potential VL has a middle electric potential that is relatively low. Accordingly, the second sub pixel corresponding to the second pixel electrode 352aC represents half-tone display of a dark gray color. In addition, the first sub pixel corresponding to the first pixel electrode 351aD represents half-tone display of a light gray color.

Figure 7C:
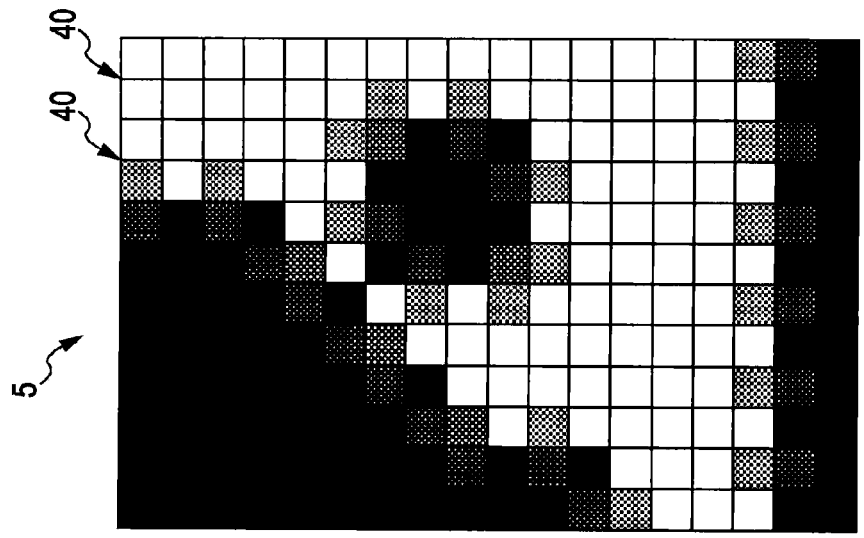
FIGS. 7A, 7B, and 7C are explanatory diagrams showing correspondence relationship of image data, the electric potential states of pixels, and a displayed image according to an embodiment of the invention.
Figure 7B:
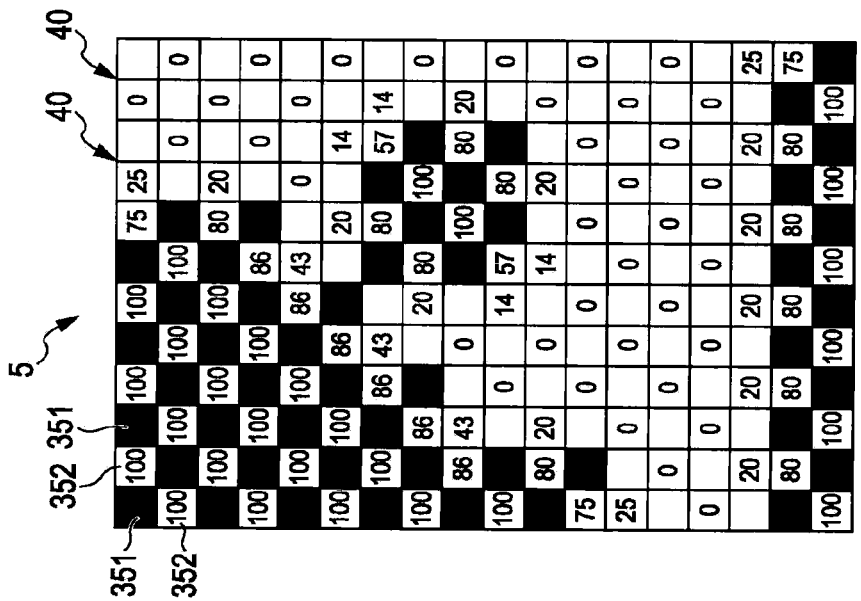
Figure 7A:
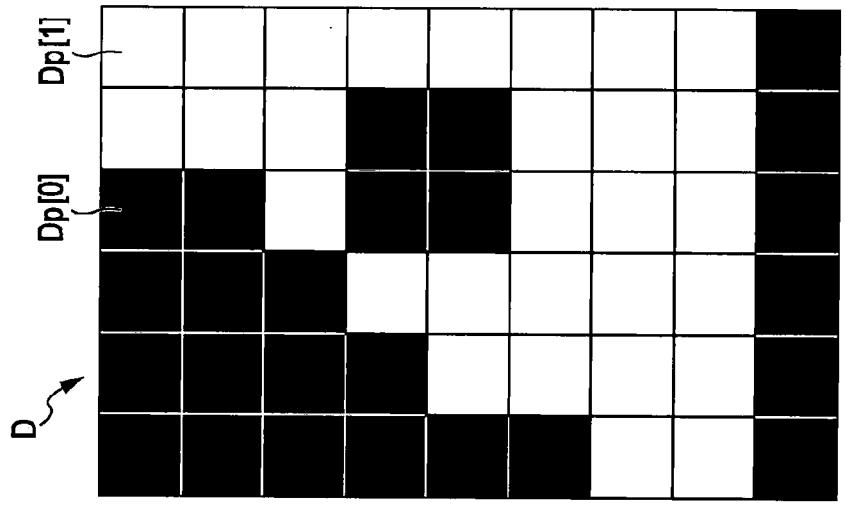

Next, FIGS. 7A, 7B, and 7C are explanatory diagrams showing correspondence relationship of image data, the electric potential states of pixels, and a displayed image.

FIG. 7A is a diagram conceptually representing image data D transmitted to the display unit 5 by an array (9 rows and 6 columns) of a matrix shape corresponding to the display unit 5. In the figure, squared grids disposed in a matrix shape correspond to pixel data that is input to each pixel 40. The pixel data Dp[0] (an image signal of a low level) corresponding to black display is denoted by a black-colored grid. In addition, pixel data Dp[1] (an image signal of a high level) corresponding to white display is denoted by a non-colored grid.

When the above-described image displaying operation is performed using the image data D shown in FIG. 7A, the electric potentials of the first and second pixel electrodes 351 and 352 that are arranged in the display unit 5 are in the state shown in FIG. 7B. In FIG. 7B, the pixels 40 are arranged in a form (9 rows and 6 columns) corresponding to FIG. 7A. In each pixel 40, two first pixel electrodes 351 and two second pixel electrodes 352 are disposed to be alternated.

In FIG. 7B, a black-colored grid is a first sub pixel (black-displayed sub pixel) corresponding to the first pixel electrode 351 to which the high-level electric potential VH is input. On the other hand, a non-colored grid is a second sub pixel (white-displayed sub pixel) corresponding to the second pixel electrode 352 to which the low-level electric potential VL is input. In addition, a grid in which a number is written is a sub pixel corresponding to the first or second pixel electrode 351 or 352 that is in the high impedance state. A number written in the grid represents the electric potential level of the first or second pixel electrode 351 or 352 corresponding to the sub pixel. Thus, among the numbers, "100" corresponds to the high-level electric potential VH, and "0" corresponds to the low-level electric potential VL.

As shown in FIG. 7B, the first and second pixel electrodes 351 and 352 that are arranged in the display unit 5 have the low-level electric potential VL, the high-level electric potential VH, or an electric potential between the low-level electric potential VL and the high-level electric potential VH, in accordance with distribution of input image data D (pixel data Dp[0] and Dp[1]). For example, in the second sub pixel having the high impedance state of which three sides are surrounded by the first sub pixels of the black display, the electric potential of the second pixel electrode 352 is about 80% of the high-level electric potential VH. To the contrary, in the first sub pixel having the high impedance state of which three sides are surrounded by the second sub pixels of the white display, the electric potential of the first pixel electrode 351 is about 20% of the high-level electric potential VH.

FIG. 7C is a diagram showing the display state of the display unit 5 corresponding to FIGS. 7A and 7B.

As shown in FIG. 7C, in an upper left side area in which the pixels 40 of the black display are continuously disposed, although the electric potential S1 of the first control line 91 is input only to the first pixel electrodes 351, all the first and second sub pixels display the black color. In addition, in a lower right side area, in which the pixels 40 of the white display are continuously disposed, in the figure, although the electric potential S2 of the second control line 92 is input only to the second pixel electrodes 352, all the first and second sub pixels display the white color.

In addition, in an area in which the pixel 40 of the black display and the pixel 40 of the white display are adjacent, as shown in FIG. 7B, the electric potentials of the first and second pixel electrodes 351 and 352 that are in the high impedance state are between the low-level electric potential VL and the high-level electric potential VH, and whereby gray display of contrasting density corresponding to the electric potentials of the pixel electrodes is represented. Accordingly, as is clear from comparing FIGS. 7A and 7C together, an anti-aliasing process is performed for boundaries aligned in the inclining direction between an area formed of the pixel 40 of the black display and an area formed of the pixel 40 of the white display. Accordingly, smooth display in which jaggies (saw teeth shapes) are alleviated is represented.

Second Pixel Arrangement

Figure 8:
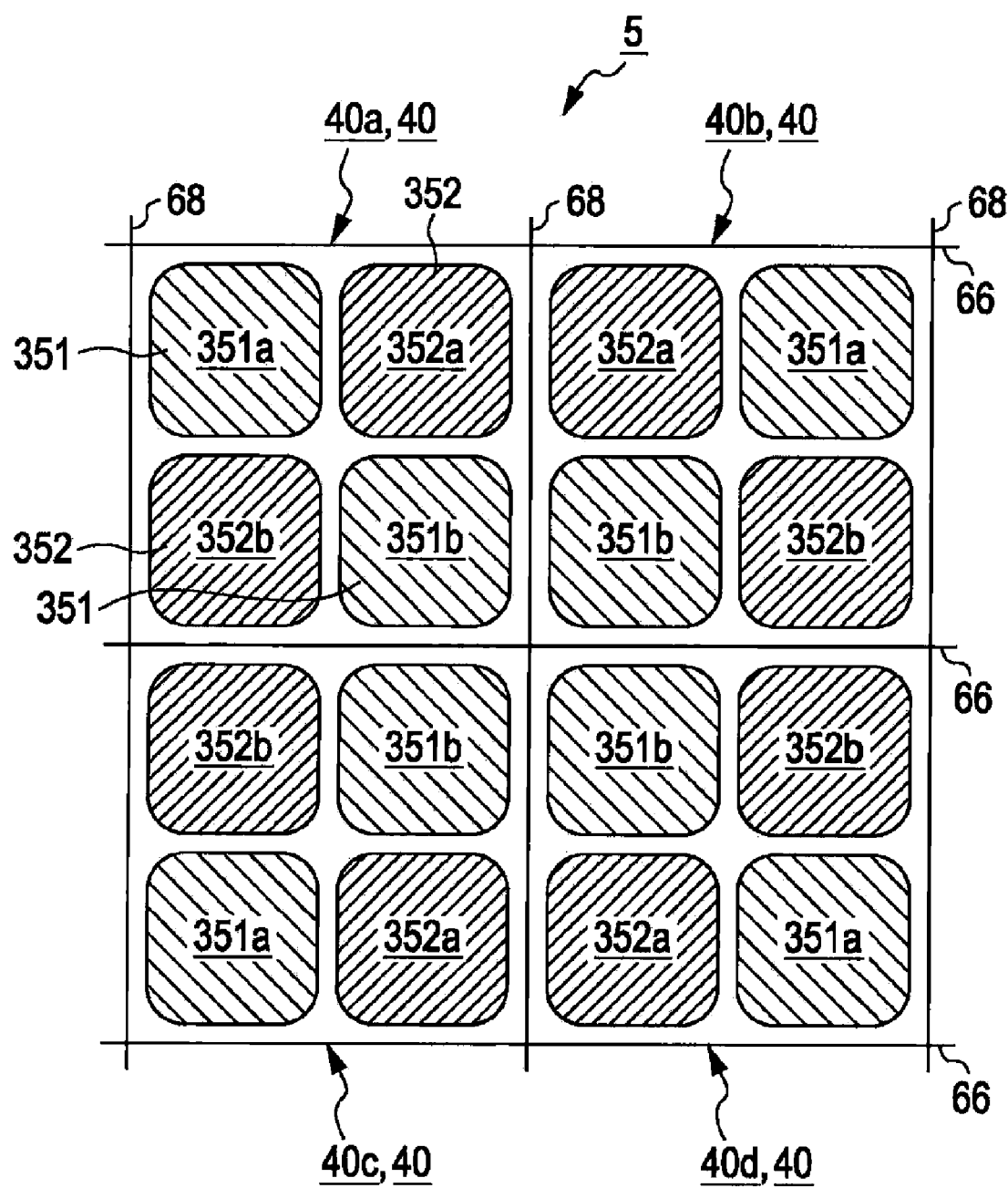
FIG. 8 is a plan view showing a second pixel arrangement according to an embodiment of the invention.

In the above-described embodiment, as shown in FIG. 3, a case (a first pixel arrangement) where the pixels 40, in which the first and second pixel electrodes 351 and 352 are disposed in a same pattern, are disposed regularly has been described. However, a different pixel arrangement may be applied to an electrophoretic display device according to an embodiment of the invention. FIG. 8 is a plan view showing the second pixel arrangement in the electrophoretic display device 100.

In FIG. 8, from among the pixels 40 arranged in the display unit 5, four pixels 40a to 40d are extracted to be shown. The pixels 40a to 40d are common that two first pixel electrodes 351a and 351b (first sub pixels) and two second pixel electrodes 352a and 352b (second sub pixels) are disposed so as to be alternated. However, the pixels 40a and 40d and the pixels 40b and 40c have different arrangements of the first pixel electrodes 351a and 351b and the second pixel electrodes 352a and 352b within the pixels.

In particular, in the pixels 40a and 40d, the first pixel electrodes 351a and 351b are disposed in a diagonal position combining the upper left side and the lower right side in the figure. On the other hand, in the pixels 40b and 40c, the first pixel electrodes 351a and 351b are disposed in a diagonal position combining the upper right side and the lower left side in the figure.

Accordingly, adjacent pixels 40a and 40b are disposed to be repeated in pixel boundaries, and pixel electrodes of a same type are disposed to be adjacent in the boundaries between the pixels. In other words, the second pixel electrode 352a of the pixel 40a and the pixel electrode 352a of the pixel 40b are disposed to be adjacent, and the first pixel electrode 351b of the pixel 40a and the first pixel electrode 351b of the pixel 40b are disposed to be adjacent.

In addition, the pixels 40a and 40c that are adjacent in the vertical direction in the figure has same disposition relationship. In other words, the second pixel electrode 352b of the pixel 40a and the second pixel electrode 352b of the pixel 40c are disposed to be adjacent, and the first pixel electrode 351b of the pixel 40a and the first pixel electrode 351b of the pixel 40c are disposed to be adjacent.

Figure 9A:
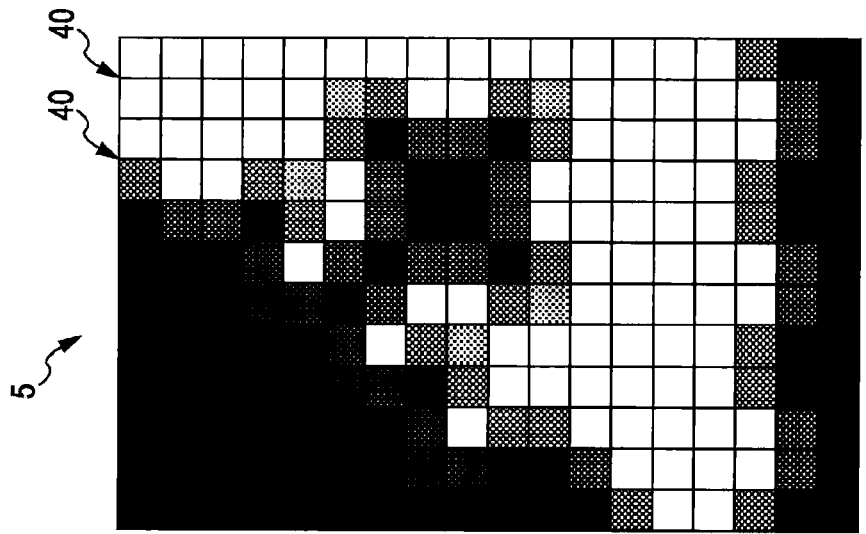
FIGS. 9A, 9B, and 9C are explanatory diagrams showing correspondence relationship of image data, the electric potential states of pixels, and a displayed image according to an embodiment of the invention.
Figure 9B:
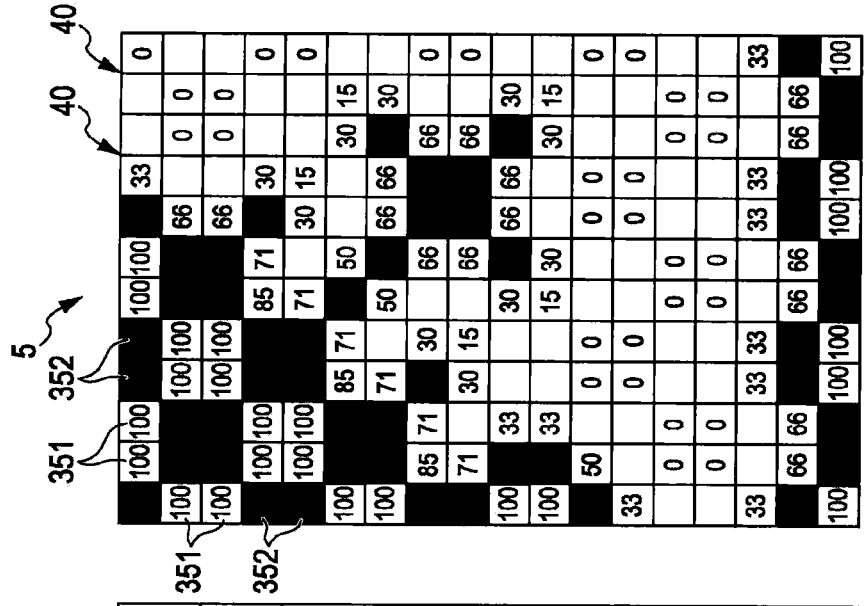
Figure 9C:
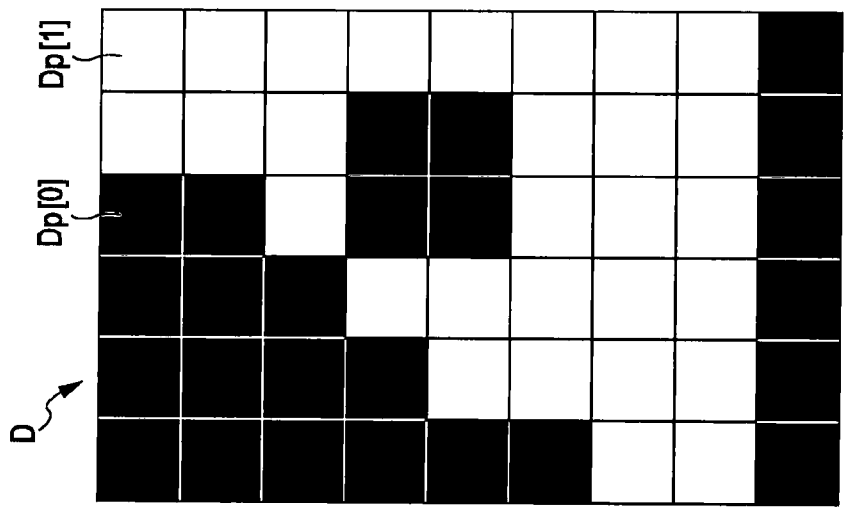

FIGS. 9A, 9B, and 9C are explanatory diagrams showing correspondence relationship of image data, the electric potential states of the pixels, and a displayed image for a case where the pixel arrangement shown in FIG. 8 is employed. FIGS. 9A to 9C correspond to FIGS. 7A to 7C described above.

In FIG. 9A, the image data D that is the same as that shown in FIG. 7A is represented. When an image displaying operation is performed using the image data D shown in FIG. 9A, the electric potentials of the first and second pixel electrodes 351 and 352 that are arranged in the display unit 5 are in the state as shown in FIG. 9B.

A display method used in FIG. 9B is common to that used in FIG. 7B.

In the pixel arrangement shown in FIG. 8, in boundary portions between the pixels 40, sub pixels of a same type are disposed to be adjacent. Accordingly, in FIG. 9B, in an area in which the pixel data DP[0] is continuous, the first sub pixels (black-colored grids) of the black display corresponding to the first pixel electrodes 351 are disposed to be adjacent. In addition, in an area in which the pixel data Dp[1] is continuous, the second sub pixels (sub pixels of the white color) of the white display corresponding to the second pixel electrodes 352 are disposed to be adjacent.

In addition, in an area in which the pixel 40 of the black display and the pixel 40 of white display are adjacent, the first sub pixel of the black display and the second sub pixel of the white display are not disposed to be adjacent. Between the sub pixels, the first or second sub pixel that is in the high impedance state is interposed.

FIG. 9C is a diagram showing the display state of the display unit 5 corresponding to FIGS. 9A and 9B.

As shown in FIG. 9C, in an upper left side area in which the pixels 40 of the black display are continuously disposed, although the electric potential S1 of the first control line 91 is input only to the first pixel electrodes 351, all the first and second sub pixels display the black color. In addition, in a lower right side area, in which the pixels 40 of the white display are continuously disposed, in the figure, although the electric potential S2 of the second control line 92 is input only to the second pixel electrodes 352, all the first and second sub pixels display the white color.

In addition, in an area in which the pixel 40 of the black display and the pixel 40 of the white display are adjacent, as shown in FIG. 9B, the electric potentials of the first and second pixel electrodes 351 and 352 that are in the high impedance state are between the low-level electric potential VL and the high-level electric potential VH, and whereby gray display of contrasting density corresponding to the electric potentials of the pixel electrodes is represented. Accordingly, an anti-aliasing process is performed for boundaries aligned in the inclining direction between an area formed of the pixel 40 of the black display and an area formed of the pixel 40 of the white display. Accordingly, smooth display in which jaggies (saw teeth shapes) are alleviated is represented.

In the case of the second pixel arrangement as described above, between the first sub pixel of the black display and the second sub pixel of the white display, the first or second sub pixel of which the pixel electrode is in the high impedance state is disposed all the time. Accordingly, in boundary areas between the black display and the white display, the first or second sub pixel having an intermediate gray scale (display of a gray color) is disposed all the time. Therefore, even compared with a case where the first pixel arrangement is employed, smooth display in which jaggies are not visually distinguished can be acquired.

In addition, in the second pixel arrangement, the sub pixel of the gray display is disposed between the boundary between the black display and the white display all the time. Accordingly, the display quality of a contour that extends in the inclining direction of the pixel arrangement is improved. On the other hand, the contour of an image that extends in a direction (a row direction and a column direction) along the pixel arrangement is blurred. However, this blurring can be visually undistinguished by implementing high precision of the display unit 5. Thus, it is preferable that the first pixel arrangement, in which the contour of an image is clearly displayed relatively, is employed for the case of a low-resolution display unit 5, and the second pixel arrangement is employed for the case of a high-resolution display unit 5.

As described above, according to the electrophoretic display device 100 according to this embodiment, display in which the contour is antialiasing-processed can be acquired by only performing a general image displaying operation without transmitting image data of an intermediate gray scale to the display unit 5 or the like.

Next, a leakage current in the electrophoretic display device 100 will be described with reference to FIGS. 10A, 10B and 10C.

Figure 10A:
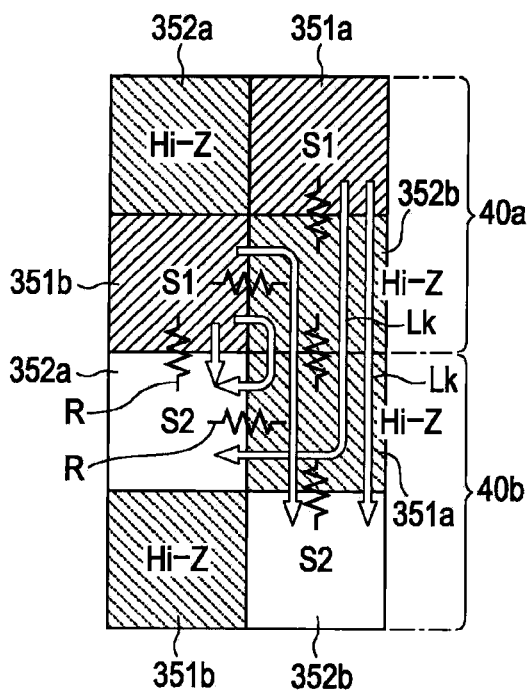
FIGS. 10A, 10B, and 10C are explanatory diagrams of leakage currents according to an embodiment of the invention.
Figure 10B:
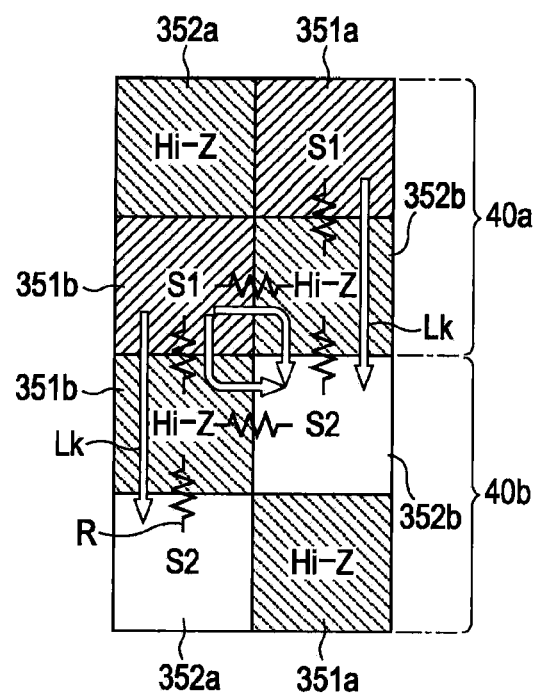
Figure 17A:
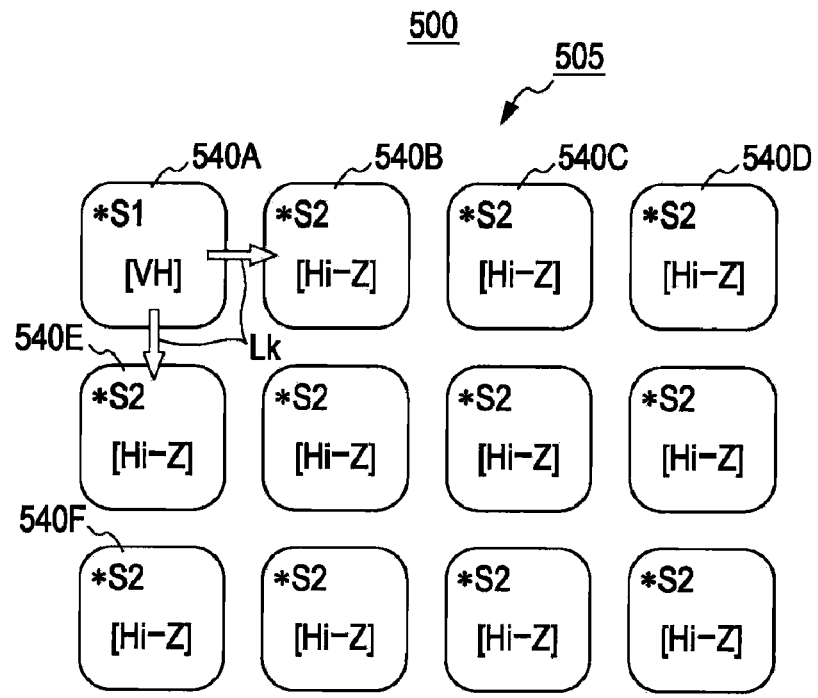
FIGS. 17A and 17B are explanatory diagrams showing a process for driving a general electrophoretic display device for partial rewriting.
Figure 17B:
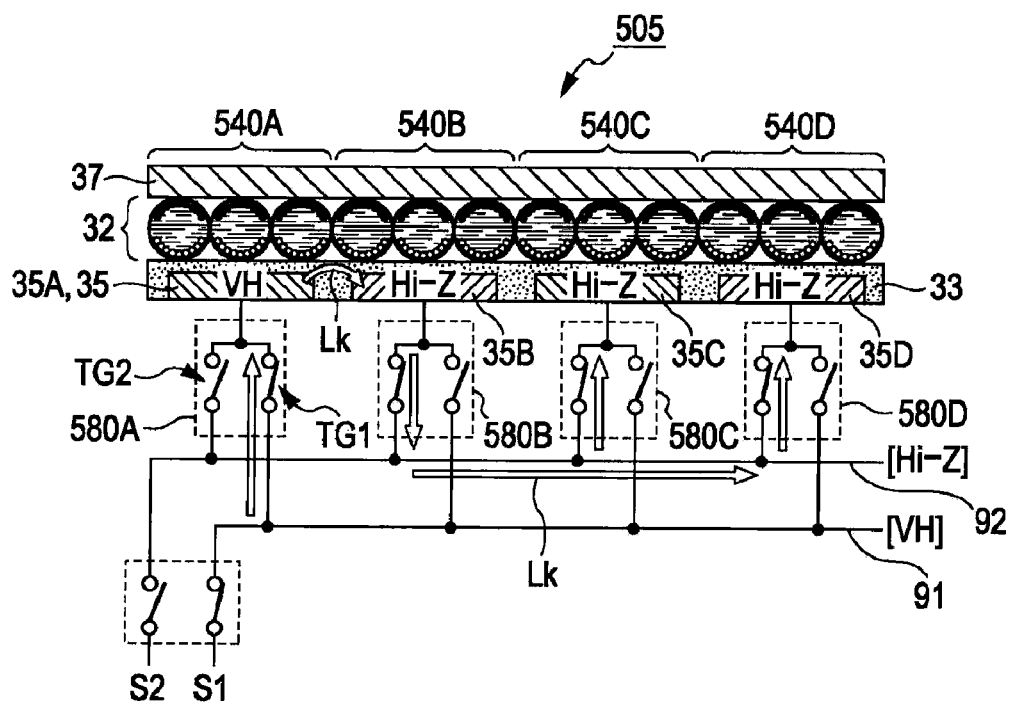
Figure 18:
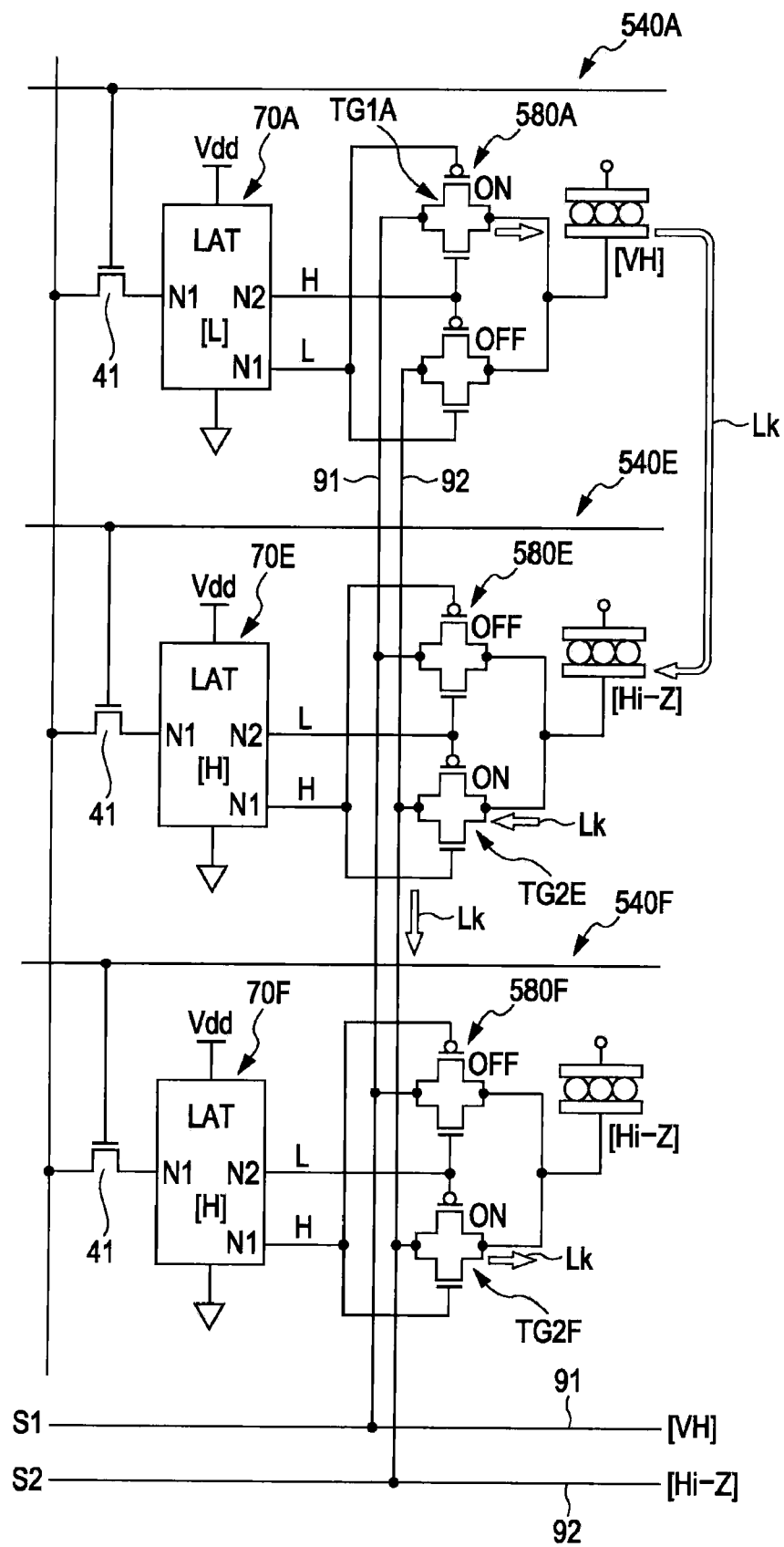
FIG. 18 is an explanatory diagram for a decrease in the contrast of a general electrophoretic display device.

FIG. 10A is an explanatory diagram of leakage currents for a case where the first pixel arrangement shown in FIG. 3 is employed. FIG. 10B is an explanatory diagram of leakage currents for a case where the second pixel arrangement shown in FIG. 8 is employed. In addition, FIG. 10C is an explanatory diagram of leakage currents for the case of a general electrophoretic display device 500 shown in FIGS. 17A and 17B.

Figure 10C:
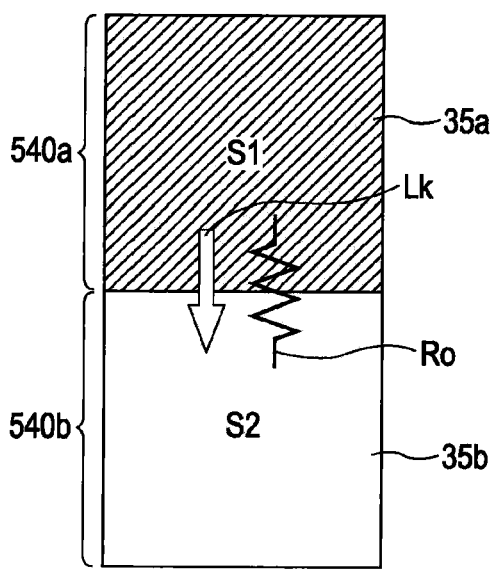

First, in the case of the general electrophoretic display device shown in FIG. 10C, when a pixel 540*a* of the black display and a pixel 540*b* of the white display are adjacent to each other, the inter-pixel leakage current Lk (leakage current) from the pixel electrode 35*a* of the pixel 540*a* toward the pixel electrode 35*b* of the pixel 540*b* is generated, as described above. In such a case, the number of the path of the inter-pixel leakage current Lk is one, and the adhesive agent layer 33 that bonds the pixel electrodes 35*a* and 35*b* and the microcapsules 20 can be regarded as resistance of Ro.

On the other hand, in the electrophoretic display device 100 in which the first pixel arrangement shown in FIG. 10A is employed, the pixel 40*a* and the pixel 40*b* are divided into four sub pixels, respectively. In the pixel 40*a*, the electric potential S1 (the high-level electric potential VH) of the first control line 91 is input only to the first pixel electrodes 351*a* and 351*b*. In addition, in the pixel 40*b*, the electric potential S2 (the low-level electric potential VL) of the second control line 92 is input only to the second pixel electrodes 352*a* and 352*b*.

Since each pixel is divided into sub pixels, the inter-pixel leakage between the pixel 40*a* and the pixel 40*b* that are shown in FIG. 10A becomes leakage currents following a plurality of paths described below.

(1) inter-pixel leakage from the first pixel electrode 351*b* of the pixel 40*a* to the second pixel electrode 352*a* of the pixel 40*b*

(2) inter-pixel leakage from the first pixel electrode 351*b* of the pixel 40*a* to the second pixel electrode 352*a* of the pixel 40*b* through the second pixel electrode 352*b* of the pixel 40*a* and the first pixel electrode 351*a* of the pixel 40*b*

(3) inter-pixel leakage from the first pixel electrode 351*b* of the pixel 40*a* to the second pixel electrode 352*b* of the pixel 40*b* through the second pixel electrode 352*b* of the pixel 40*a* and the first pixel electrode 351*a* of the pixel 40*b*

(4) inter-pixel leakage from the first pixel electrode 351*a* of the pixel 40*a* to the second pixel electrode 352*a* of the pixel 40*b* through the second pixel electrode 352*b* of the pixel 40*a* and the first pixel electrode 351*a* of the pixel 40*b*

(5) inter-pixel leakage flowing from the first pixel electrode 351*a* of the pixel 40*a* to the second pixel electrode 352*b* of the pixel 40*b* through the second pixel electrode 352*b* of the pixel 40*a* and the first pixel electrode 351*a* of the pixel 40*b*

First, in the leakage path (1), pixel electrodes having different electric potentials are adjacent. However, a length of the boundary between the first pixel electrode 351*b* (the high-level electric potential VH) of the pixel 40*a* and the second pixel electrode 352*a* (the low-level electric potential VL) of the pixel 40*b* is equal to or smaller than a half of that of the pixel electrodes 35*a* and 35*b* shown in FIG. 10C. Accordingly, the path of the leakage current is narrowed, and therefore the leakage current is decreased by that much.

Next, in the leakage paths (2) to (5), until reaching the second pixel electrodes 352*a* and 352*b* having the low-level electric potential VL from the first pixel electrodes 351*a* and 351*b* having the high-level electric potential VH, the leakage currents pass though the second pixel electrode 352*b* of the pixel 40*a* and the first pixel electrode 351*a* of the pixel 40*b* that are in the high impedance state. Accordingly, each time the leakage currents pass through the boundary of the pixel electrodes, resistance R of the adhesive agent layer 33 is loaded. Therefore, the leakage currents flowing into the second pixel electrodes 352*a* and 352*b* of the pixel 40*b* having the low-level electric potential VL are decreased.

As described above, in the electrophoretic display device 100 according to an embodiment of the invention, a pixel 40 is divided into a plurality of sub pixels. Accordingly, the number of paths of the inter-pixel leakage currents Lk is increased. However, on the other hand, the amount of the current flowing per one leakage path is decreased markedly. As a result, the amount of a total leakage current is decreased, compared to a general case shown in FIG. 10C, so as to be about 80% of the general case. Therefore, according to the electrophoretic display device 100 of this embodiment, power consumption of the display unit 5 can be suppressed.

Next, for the second pixel arrangement shown in FIG. 10B, leakage paths as below are formed.

(1) inter-pixel leakage from the first pixel electrode 351*b* of the pixel 40*a* to the second pixel electrode 352*a* of the pixel 40*b* through the first pixel electrode 351*b* of the pixel 40*b*

(2) inter-pixel leakage from the first pixel electrode 351*b* of the pixel 40*a* to the second pixel electrode 352*b* of the pixel 40*b* through the first pixel electrode 351*b* of the pixel 40*b*

(3) inter-pixel leakage from the first pixel electrode 351*b* of the pixel 40*a* to the second pixel electrode 352*b* of the pixel 40*b* through the second pixel electrode 352*b* of the pixel 40*a*

(4) inter-pixel leakage from the first pixel electrode 351*a* of the pixel 40*a* to the second pixel electrode 352*b* of the pixel 40*b* through the second pixel electrode 352*b* of the pixel 40*a*

As described above, according to the electrophoretic display device 100 employing the second pixel arrangement, the number of the leakage paths is smaller than that of the first pixel arrangement. In addition, in the second pixel arrangement shown in FIG. 10B, the first pixel electrodes 351*a* and 351*b* of the pixel 40*a* that have the high-level electric potential VH and the second pixel electrodes 352*a* and 352*b* of the pixel 40*b* that have the low-level electric potential VL are disposed so as not to be adjacent. Accordingly, the leakage paths (1) to (4) become paths of high resistance through the sub pixels of which pixel electrodes are in the high impedance state all the time.

As described above, when the second pixel arrangement is employed, the leakage current can be decreased further, compared to a case where the first pixel arrangement shown in FIG. 10A is employed, so as to be 70% of the general case.

In addition, according to the electrophoretic display device 100 of this embodiment, a decrease in the contrast in a driving process for partial rewriting can be prevented. In other words, as described above, in any between the first pixel arrangement and the second pixel arrangement, the leakage current is decreased, compared to a general electrophoretic display device 500. Accordingly, supply of electric charges to the pixels 40 in which display is not changed is reduced. Therefore, a change in the contrast of the entire screen can be suppressed.

In addition, when the second pixel arrangement is employed, a decrease in the contrast in the driving process for partial rewriting can be prevented more effectively. Hereinafter, a detailed description thereof will be followed with reference to FIGS. 11 and 12.

Figure 12:
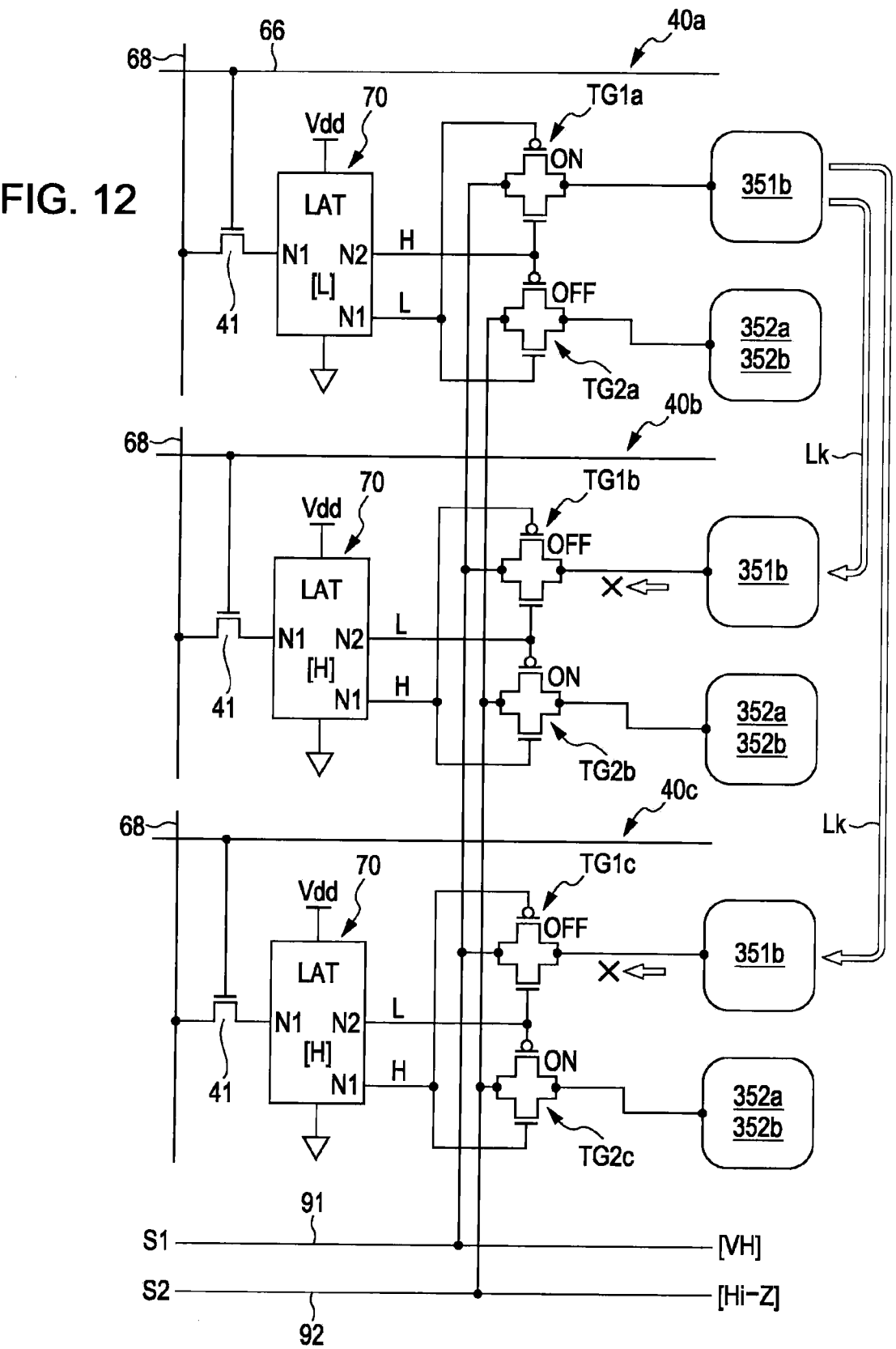
FIG. 12 is an explanatory diagram representing reaction of suppressing a decrease in the contrast according to an embodiment of the invention.

FIG. 11 is an explanatory diagram showing the electric potential state of the display unit 5 in the driving process for partial rewriting. FIG. 12 is an explanatory diagram representing reaction of suppressing a decrease in the contrast.

In FIG. 11, among the pixels 40 of the display unit 5, six pixels 40a to 40f that are disposed in three rows and two columns are shown. Among the pixels 40a to 40f, the pixel 40a located on the upper left end in the figure is a pixel to be rewritten, and other pixels 40b to 40f are pixels in which display thereof is maintained.

As shown in FIG. 11, in the pixel 40a to be rewritten, the electric potential S1 (the high-level electric potential VH) of the first control line 91 is input to the first pixel electrodes 351a and 351b, and the second pixel electrodes 352a and 352b are in the high impedance state. On the other hand, in the pixels 40b to 40f in which display is maintained, both the first electrodes 351a and 351b and both the second pixel electrodes 352a and 352b are in the high impedance state. In the above-described electric potential state, by inputting a low-level electric potential VL (or a pulse in which the high-level electric potential VH and the low-level electric potential VL are repeated) to the common electrode 37, only the pixel 40a can be selectively displayed in the black color.

In the state shown in FIG. 11, since the electric potential S1 (the high-level electric potential VH) is input only to the first pixel electrodes 351a and 351b of the pixel 40a, inter-pixel leakage currents Lk are generated between the first pixel electrodes 351a and 351b and the first or second pixel electrodes adjacent thereto.

In the second pixel arrangement shown in FIG. 11, the first pixel electrodes 351 and the second pixel electrodes 352 are disposed with the boundary of the pixels 40 interposed therebetween. Thus, according to the second pixel arrangement, in the pixel 40a to be rewritten, the first pixel electrodes 351a and 351b having the high-level electric potential VH and the second pixel electrodes 352a and 352b that are in the high impedance state are adjacent. In addition, the first pixel electrode 351b of the pixel 40b and the first pixel electrode 351b of the pixel 40c that are located adjacent to the first pixel electrode 351b of the pixel 40a are in the high impedance state.

Here, in FIG. 12, the paths of the inter-pixel leakage currents Lk are shown together with the pixel circuits of the pixels 40a to 40c.

As shown in FIG. 12, the inter-pixel leakage currents Lk flow from the first pixel electrode 351b of the pixel 40a toward the first pixel electrode 351b of the pixel 40b and the first pixel electrode 351b of the pixel 40c. However, in the pixel 40b and the pixel 40c, the first transmission gates TG1b and TG1c connected the first pixel electrodes 351b thereof are in the OFF state. Accordingly, electric charges flowed in the first pixel electrodes 351b are blocked by the first transmission gates TG1b and TG1c so as not to flow in the first control line 91 that is the global wiring.

As described above, when the second pixel arrangement is employed in the electrophoretic display device 100, the leakage currents flowing from the pixel 40a to be rewritten toward the pixels 40b and 40c located adjacent to each other do not flow in the first control line 91 or the second control line 92. Accordingly, in the driving process for partial rewriting, the contrast of the pixels 40 in which display is maintained is not changed, and thereby high-quality display can be acquired.

In addition, in the above-described embodiment, a configuration in which the pixel 40 is divided into four sub pixels has been described. However, the technical scope of the invention is not limited thereto. For example, the pixel 40 may be divided into six parts (three first sub pixels and three second sub pixels) or nine parts (four or five first sub pixels and five or four second sub pixels). As the number of divisions is increased, the effect of the anti-aliasing process is increased, and whereby more smooth display can be acquired.

In addition, when the pixel 40 is divided into five or more, it is preferable that the first and second sub pixels are arranged to be alternated within the pixel 40. However, the invention is not limited thereto, and any arbitrary arrangement can be employed.

In addition, in a case where the pixel 40 is divided into multiple divisions, when the first pixel arrangement shown in FIG. 3 or the second pixel arrangement shown in FIG. 8 is employed, it is preferable that the arrangement of the first pixel electrode 351 and the second pixel electrode 352 that are brought into contact with the boundary portion of the pixels 40 located adjacent to each other is primarily focused. In other words, when the first pixel arrangement is employed, it is preferable that the first pixel electrodes 351 and the second pixel electrodes 352 are disposed with the boundary of adjacent pixels 40 interposed therebetween. On the other hand, when the second pixel arrangement is employed, it is preferable that the first pixel electrodes 351 and the second pixel electrodes 352 are disposed with the boundary of the adjacent pixels 40 interposed therebetween. The first and second pixel electrodes 351 and 352 that are not brought into contact with the boundary of the pixels 40 may be disposed arbitrarily.

Electronic Apparatus

Next, cases where the electrophoretic display device 100 according to each of the above-described embodiment is applied to an electronic apparatus will be described.

Figure 13:
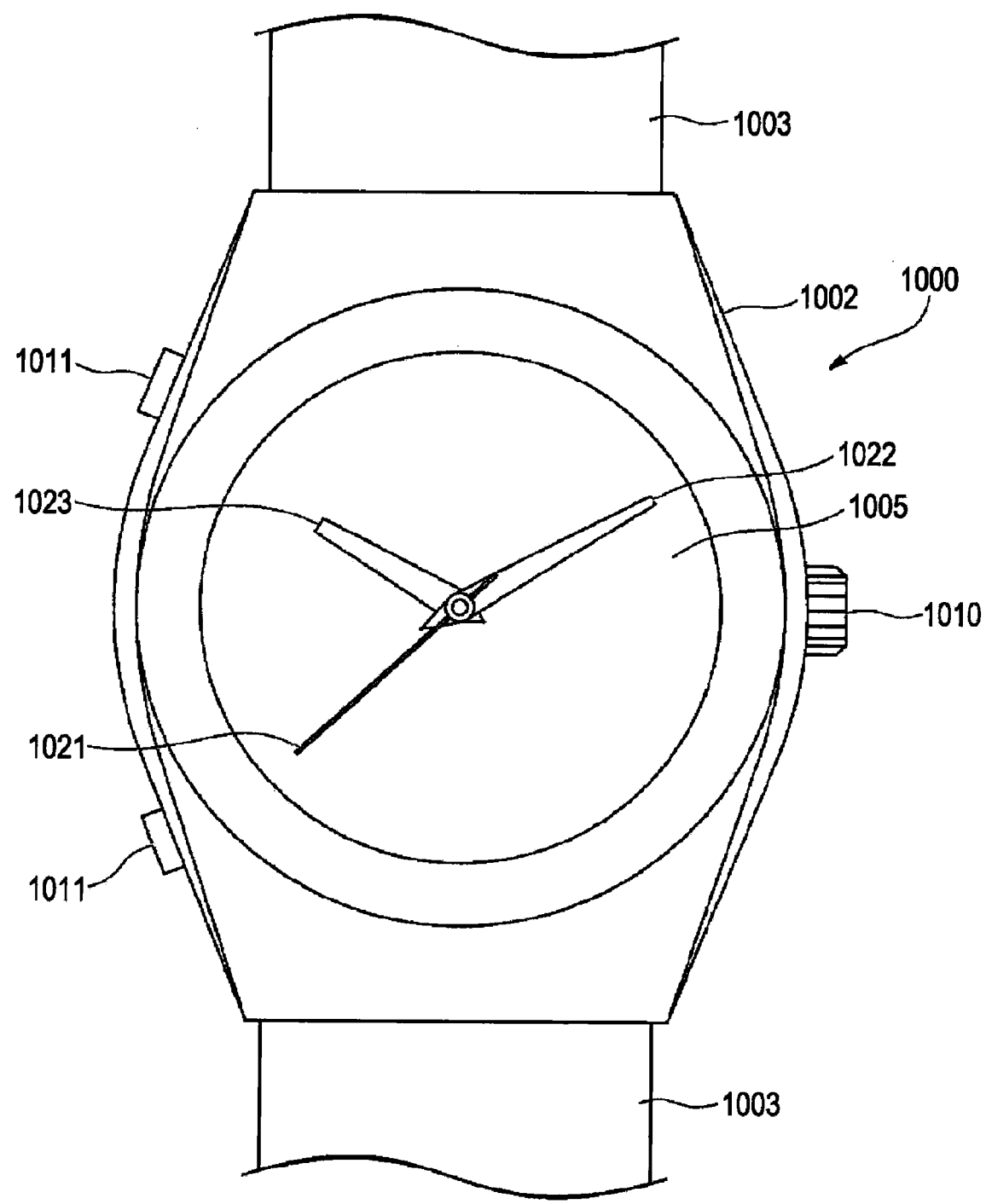
FIG. 13 is a diagram showing a wrist watch as an example of an electronic apparatus according to an embodiment of the invention.

FIG. 13 is a front view of a wrist watch 1000. The wrist watch 1000 includes a watch case 1002 and a pair of bands 1003 connected to the watch case 1002.

On the front side of the watch case 1002, a display unit 1005 that is configured by the electrophoretic display device 100 according to each of the above-described embodiments, a second hand 1021, a minute hand 1022, and an hour hand 1023 are disposed. In addition, on the side of the watch case 1002, a winder 1010 as an operator and an operation button 1011 are disposed. The winder 1010 is connected to a hand setting stem (not shown) disposed inside the case and is provided such that the winder together with the hand setting stem can be pushed or pulled at multiple levels (for example, two levels) and rotated. In the display unit 1005, an image that becomes the background, a character string such as date or time, a second hand, a minute hand, and an hour hand, and the like can be displayed.

Figure 14:
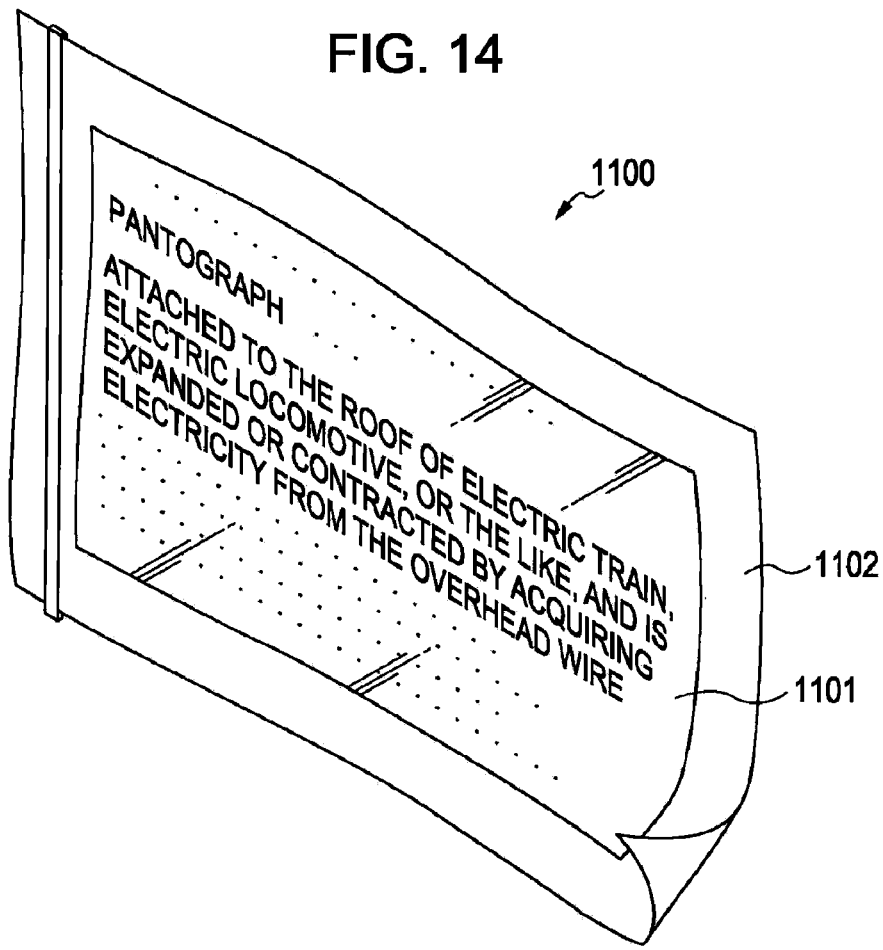
FIG. 14 is a diagram showing an electronic paper apparatus as an example of an electronic apparatus according to an embodiment of the invention.

FIG. 14 is a perspective view showing the configuration of an electronic paper apparatus 1100. The electronic paper apparatus 1100 includes the electrophoretic display device 100 according to each of the above-described embodiments in a display area 1101. The electronic paper apparatus 1100 has flexibility and is configured to include a main body 1102 formed of a rewritable sheet having same texture and flexibility as those of a general paper sheet.

Figure 15:
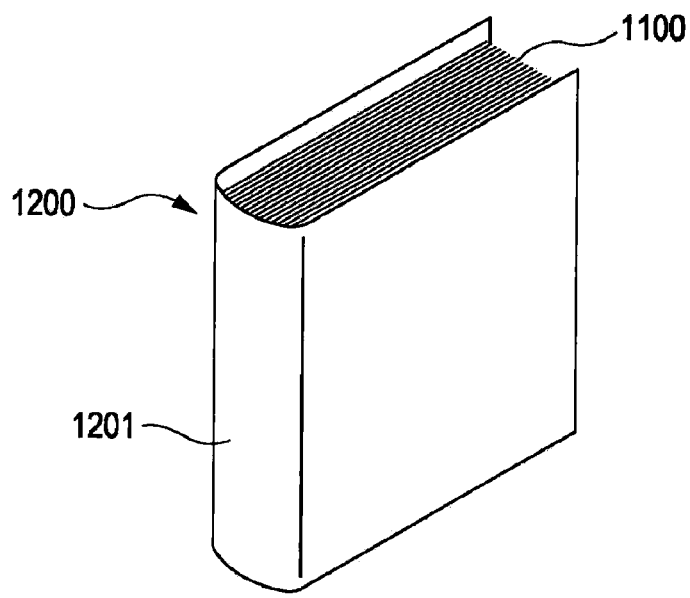
FIG. 15 is a diagram showing an electronic notebook as an example of an electronic apparatus according to an embodiment of the invention.
Figure 16A:
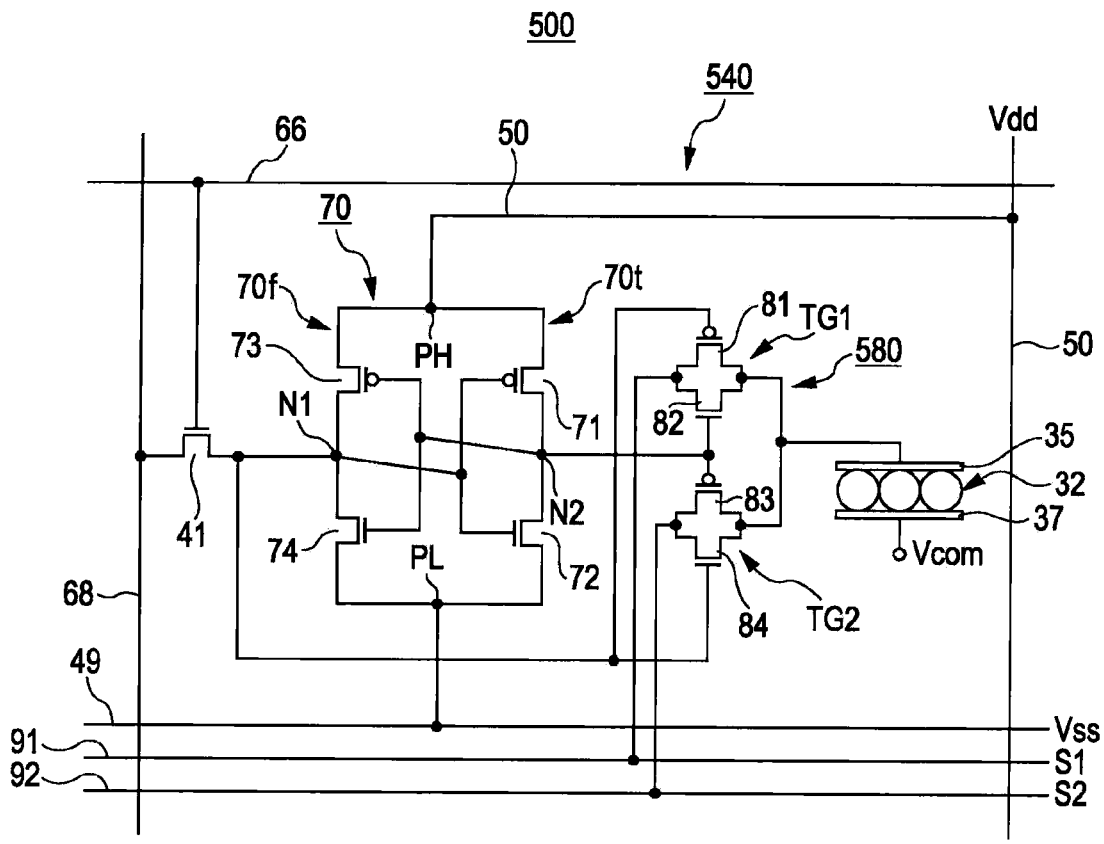
FIGS. 16A and 16B are diagrams showing a general electrophoretic display device.
Figure 16B:
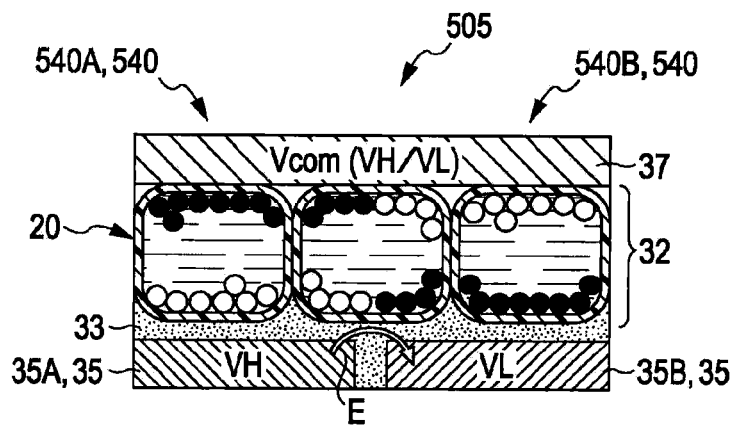

FIG. 15 is a perspective view showing the configuration of an electronic notebook 1200. The electronic notebook 1200 is formed by binding a plurality of the electronic paper apparatuses 1100 and inserting the electronic paper apparatuses into a cover 1201. The cover 1201 includes a display data inputting unit, not shown in the figure, that receives display data, for example, transmitted from an external apparatus. Accordingly, the display content of the electronic paper apparatuses can be changed or updated in accordance with the display data in a state that the electronic paper apparatuses are bound.

According to the wrist watch 1000, the electronic paper apparatus 1100, and the electronic notebook 1200, the electrophoretic display device 100 according to an embodiment of the invention is employed, and therefore the electronic apparatuses have display units capable of smooth high-quality display of a contour and saving power consumption can be implemented.

In addition, the above-described electronic apparatuses are examples of electronic apparatuses according to embodiments of the invention and do not limit the technical scope of the invention. For example, the electrophoretic display device according to an embodiment of the invention can be appropriately used in a display unit of an electronic apparatus such as a cellular phone, a mobile audio apparatus, or the like.

The entire disclosure of Japanese Patent Application No. 2008-173536, filed Jul. 2, 2008 is expressly incorporated by reference herein.

What is claimed is:

1. An electrophoretic display device comprising:
a first substrate and a second substrate that face each other;
an electrophoretic element disposed between the first substrate and the second substrate, the electrophoretic element including electrophoretic particles;
a display unit that has a plurality of pixels including the electrophoretic element;
a common electrode that is formed on an electrophoretic element side of the second substrate; and
a first control line and a second control line that are formed in either the first substrate or the second substrate,
wherein each of the plurality of pixels includes:
a pixel switching element;
a memory circuit that is connected to the pixel switching element;
a switching circuit that is connected to the memory circuit;
two first pixel electrodes and two second pixel electrodes that are connected to the switching circuit and are disposed to face the common electrode, the first pixel electrodes and the second pixel electrodes being disposed so as to be alternated two-dimensionally up-and-down and right-and-left within each of the plurality of pixels; and
the first pixel electrodes and the second pixel electrodes of four adjacent ones of the plurality of pixels are disposed so as to be alternated two-dimensionally up-and-down and right-and-left within the adjacent four pixels, and
wherein the switching circuit includes:
a first switch that controls a conductive state between the first control line and the first pixel electrodes in accordance with an output signal of the memory circuit; and
a second switch that controls a conductive state between the second control line and the second pixel electrodes in accordance with the output signal of the memory circuit.

2. The electrophoretic display device according to claim 1, wherein, in a boundary portion of two adjacent pixels among the plurality of pixels, one of the first pixel electrodes of one pixel of the two adjacent pixels and one of the second pixel electrodes of the other pixel of the two adjacent pixels are disposed to be adjacent to each other.

3. The electrophoretic display device according to claim 1, wherein, in a boundary portion of two adjacent pixels among the plurality of pixels, one of the first pixel electrodes of one pixel of the two adjacent pixels and one of the first pixel electrodes of the other pixel of the two adjacent pixels are disposed to be adjacent to each other.

4. The electrophoretic display device according to claim 1, wherein at least one electrode of the first pixel electrode and the second pixel electrode that configure each of the plurality of pixels is in a high impedance state at the time of performing an image displaying operation.

5. An electronic apparatus comprising the electrophoretic display device according to claim 1.

* * * * *